United States Patent
Koide

(10) Patent No.: US 6,890,078 B2
(45) Date of Patent: May 10, 2005

(54) PROJECTION TYPE IMAGE DISPLAY APPARATUS AND IMAGE DISPLAY SYSTEM

(75) Inventor: Jun Koide, Tokyo (JP)

(73) Assignee: Canon Kabushiki Kaisha (JP)

( * ) Notice: Subject to any disclaimer, the term of this patent is extended or adjusted under 35 U.S.C. 154(b) by 9 days.

(21) Appl. No.: 10/612,795

(22) Filed: Jul. 1, 2003

(65) Prior Publication Data

US 2004/0008326 A1 Jan. 15, 2004

(30) Foreign Application Priority Data

Jul. 3, 2002 (JP) ........................................ 2002-195056
Jul. 31, 2002 (JP) ........................................ 2002-224211
Oct. 9, 2002 (JP) ........................................ 2002-296120

(51) Int. Cl.[7] ...................... G03B 21/00; G03B 21/16; G03B 21/18; G09G 3/30
(52) U.S. Cl. ........................ 353/31; 353/52; 353/122; 345/76
(58) Field of Search .................. 353/31, 52, 122, 353/84; 345/76; 359/449, 453, 460

(56) References Cited

U.S. PATENT DOCUMENTS 5,613,748 A * 3/1997 Yoshida et al. ............. 359/460
5,953,053 A * 9/1999 Chen et al. ............... 348/14.16
6,114,715 A * 9/2000 Hamada ........................ 257/72
6,259,423 B1   7/2001 Tokito et al.
6,724,529 B2 * 4/2004 Sinkoff ........................ 359/443
6,744,416 B2 * 6/2004 Mizutani et al. ............... 345/88

FOREIGN PATENT DOCUMENTS

| JP | 7-230880 | 8/1995 |
| JP | 11-67448 | 3/1999 |
| JP | 2000-66301 | 3/2000 |

* cited by examiner

*Primary Examiner*—Christopher Mahoney
(74) *Attorney, Agent, or Firm*—Morgan & Finnegan, LLP

(57) ABSTRACT

A projection type image display apparatus which suppresses deterioration in luminous efficiency of an organic EL element and reduces flickering of projected images and an amplitude of a power supply capacity is disclosed. The apparatus comprises an electroluminescence (EL) element, a projection optical system, and a controller which generates drive signals to control the emission amount from the EL element. An EL material used for a luminescent layer of the EL element is a phosphorescent material which emits phosphorescence by priority, which is emitted from an excited triplet state. The controller generates drive signals by superimposing an intermittent turning-on signal on emission amount modulating signals to modulate current values to be injected into pixels according to display image signals.

16 Claims, 17 Drawing Sheets

PROJECTION TYPE IMAGE DISPLAY APPARATUS AND IMAGE DISPLAY SYSTEM

BACKGROUND OF THE INVENTION

1. Field of the Invention

The present invention relates to a projection type image display apparatus such as a projector, etc.

2. Description of Related Art

Conventionally, a projection type image display apparatus uses a liquid crystal panel or a micromirror device as a light modulation device for switching, and displays an image on a screen by projecting a light pattern selected upon controlling light transmission and shielding or polarization.

However, in the abovementioned display, when a liquid crystal panel or a micromirror device is used as a light modulation device, it is necessary that shielded light is removed as unnecessary energy by being absorbed by a polarizer or a light absorbing medium.

In the case of liquid crystals, unnecessary illumination light exists due to the light transmittance, the aperture efficiency of each pixel or accuracy of polarization control. Furthermore, in the case of the micromirror device, it is difficult to efficiently use the pupil of an axially symmetric optical system depending on the aperture efficiency of each pixel and the numerical aperture of a projection lens due to oblique-incidence illumination and the numerical aperture of an illumination system.

Therefore, in order to make a displayed image brighter, a metal halide and a high-pressure mercury lamp is used as a light source, however, a high voltage is required as a light source voltage, so that the light source generates high heat.

Japanese Patent Laid-Open No. H11(1999)-67448 (corresponding to U.S. Pat. No. 6,259,424) and Japanese Patent Laid-open No. 2000-66301 propose method for radically solving this low energy usability. In these two proposals, a luminescent panel (hereinafter, referred to as an organic EL panel) including matrix-arranged organic electroluminescence elements (hereinafter, referred to as organic EL elements) is used, the respective organic EL elements of this organic EL panel are driven to emit light based on image signal, and the projection optical system projects and displays an image on a display target object. The organic EL elements require no illumination light sources separately since they are self-emitting devices, and no transmission type liquid crystal panel is required since the organic EL panel emits light including image information. Therefore, obtained light can be efficiently utilized for display. Accordingly, without generating unnecessary light energy, high-luminance display can be easily achieved at a low electric power, and an image can be outputted by only the organic EL panel, so that the apparatus structure becomes simple and can be easily reduced in size and weight.

However, after the organic EL elements continuously emit light at a high luminance, luminance greatly lowers. One of the causes of this problem is that heat is generated due to a current supplied for driving the organic EL elements, accumulates, and raises the element temperature, and this deteriorates the structure and characteristics of the organic thin films and gradually lowers luminous efficiency.

On the other hand, as a technique for suppressing luminance lowering of organic EL elements, pulse intermittent turning-on drive of organic EL elements is disclosed in Japanese Patent Laid-Open No. H07(1995)-230880. With this technique, deterioration of luminous efficiency of organic EL elements is considerably suppressed.

However, in a case where images are displayed by, for example, 60 frames per second by means of pulse intermittent turning-on drive of organic EL elements, when a dark image with a small turning-on pulse time duty is displayed, flickering is observed due to intermittent emission. Furthermore, when emission pixels of R, G, and B that are three primary colors or organic EL panels are made to simultaneously emit light, the amplitude of the power supply increases, so that allowance must be given for the power to be supplied or the power source capacity must be increased.

Furthermore, a possible cause of efficiency lowering of the organic EL elements is as follows. That is, an organic EL material itself changes its chemical structure into anion or cation excitons and repeats light energy emission according to potential energy displacement, and furthermore, an organic electroluminescent layer is composed by using a fluorescent or phosphorescent material as a luminous body and a material for dispersing the abovementiond material and transporting electronic charge carriers to the luminous bodies, so that the probability that the organic EL material that changes its chemical structure or causes particle aggregation to emit light changes into a form other than the desired change form does not theoretically become 0%.

The speed of changing into a form other than the desired change form is influenced by state stability of the luminescent material, combination of an electronic charge carrier transporting material, etc., that serves as a binder and environmental medium materials, applied electric intensity, hydrolysis according to the moisture environment, and defect potential generation, etc. Among these, as a main cause of deterioration concerning the speed of chemical reaction, there is deterioration acceleration due to a self-raising temperature parameter according to heat energy generation in a photoelectric converting process.

This deterioration acceleration roughly follows the Arrenius equation. Therefore, when emission driving is carried out in a low-power supplied condition at a low temperature, the speed of changing the photoelectric conversion efficiency slows and lengthens the life. However, as the power to be supplied is increased to increase the emission intensity, the photoelectric conversion efficiency exponentially lowers, resulting in a short life of the element. For example, on the assumption that the quality guarantee period of normal commercial-off-the-shelf products is one year, stable emission for several thousands to tens of thousands of hours is required. Therefore, nonconformity occurs in that the quality stability lowers as it is attempted to achieve brighter and higher-quality image display.

Furthermore, a reduction in deterioration speed of the photoelectric conversion efficiency of the organic EL material can be achieved by cooling the EL elements themselves to a low temperature, however, it is also influenced by the outside humidity in a case where the cooling temperature is maintained at a temperature lower than the outside air temperature. For example, in a high-temperature high-humidity environment, for example, at a temperature of 30° C. and a humidity of 80%, water vapor condenses into dew condensation on the EL elements, and when waterdrops are generated in the light emission direction, it becomes impossible that an image to be displayed by the EL elements is projected as it is by a projection lens, resulting in a distorted image being projected.

In addition, as a result of forcibly cooling the organic EL elements, cooling energy is required separately, and this spoils the advantage of a reduction in energy consumption that is the original intent of using the organic EL elements.

SUMMARY OF THE INVENTION

An object of the invention is to obtain an effect of suppressing deterioration in luminous efficiency of organic EL elements due to luminance modulation of pixels in response to pulse intermittent turning-on drive, and to reduce flickering of projected images and amplitude of the power supply capacity.

Furthermore, another object of the invention is to provide a projection type image display apparatus having little deterioration in photoelectric conversion efficiency of organic EL elements which can individually modulate pixels.

In order to achieve the abovementioned objects, a projection type image display apparatus of the present invention comprises an electroluminescence (EL) element having a plurality of pixels which can be individually modulated, a projection optical system which projects light emitted from individual modulated pixels inside the EL element, and a controller which controls drive signals that control the emission amount of the EL element. An EL material used for the luminescent layer is a phosphorescent material which emits phosphorescence by priority, which is emitted from an excited triplet state. The controller superimposes an intermittent turning-on signal with a predetermined cycle on emission amount modulating signals for modulating the injected current values into the pixels according to display image signals to generate drive signals.

Furthermore, another projection type image display apparatus of the present invention comprises an EL element having pixels which can be individually modulated. An EL layer of the EL element is composed of a material containing an organic fluorescent material or organic phosphorescent material. Furthermore, this projection type image display apparatus comprises a projection optical system which projects modulated light emitted from individual pixels of the EL element, an element temperature detector which detects the temperature of the EL element, an outside air temperature detector which detects the outside air temperature, a cooling unit provided on a surface of the EL element other than a light emitting surface, and a controller which controls the cooling unit so that a temperature detected by the element temperature detector is equal to or lower than a temperature detected by the outside air temperature detector and the difference between these temperatures falls within a predetermined range.

Furthermore, still another projection type image display apparatus of the present invention comprises an EL element having a plurality of pixels including red, green, and blue pixels, and a projection optical system which projects light from the EL element onto a predetermined surface. At least pixels which emit one of the red, green and blue colors use an inorganic EL material for emission.

The characteristics of the projection type image display apparatuses of the invention will become clearer by means of description of the embodiments below with reference to the accompanying drawings.

DETAILED DESCRIPTION OF THE PREFERRED EMBODIMENTS

Hereinafter, embodiments of a projection type image display apparatus of the present invention are described with reference to the accompanying drawings.

Embodiment 1

Figure 1:
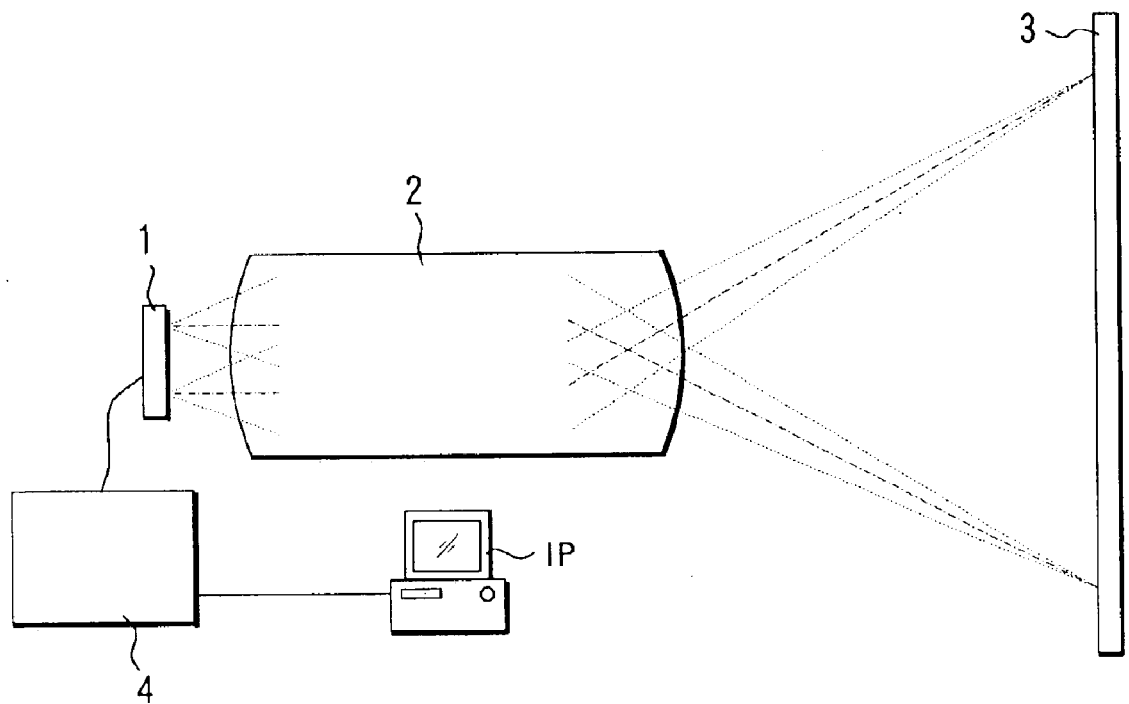
FIG. 1 is a sectional view of an optical system of a projector of Embodiment 1 of the present invention.

FIG. 1 is a sectional view of a main optical system forming a projector (projection type image display apparatus) of Embodiment 1 of the present invention.

An EL element 1 emits light including image information. This EL element 1 comprises a plurality of pixels which emit image information as emission pattern information.

A controller 4 comprises a CPU, etc., which electrically controls the EL element 1 in response to image signals from an image signal providing apparatus IP such as a personal computer, a DVD player, a VCR, a video camera, a television, or a unit of an antenna to receive image signal and a tuner (the same applies to the next Embodiment 2 although it is not shown). The EL element 1 emits light based on electrical signals from the controller 4.

Light emitted from the EL element 1 is projected onto a screen 3 by a projection lens 2. The screen 3 has light diffusibility on its surface, and an observer recognizes an image by viewing the light diffused and reflected on the screen 3. A detailed structure of the EL element 1 will be described later.

Embodiment 2

Figure 2:
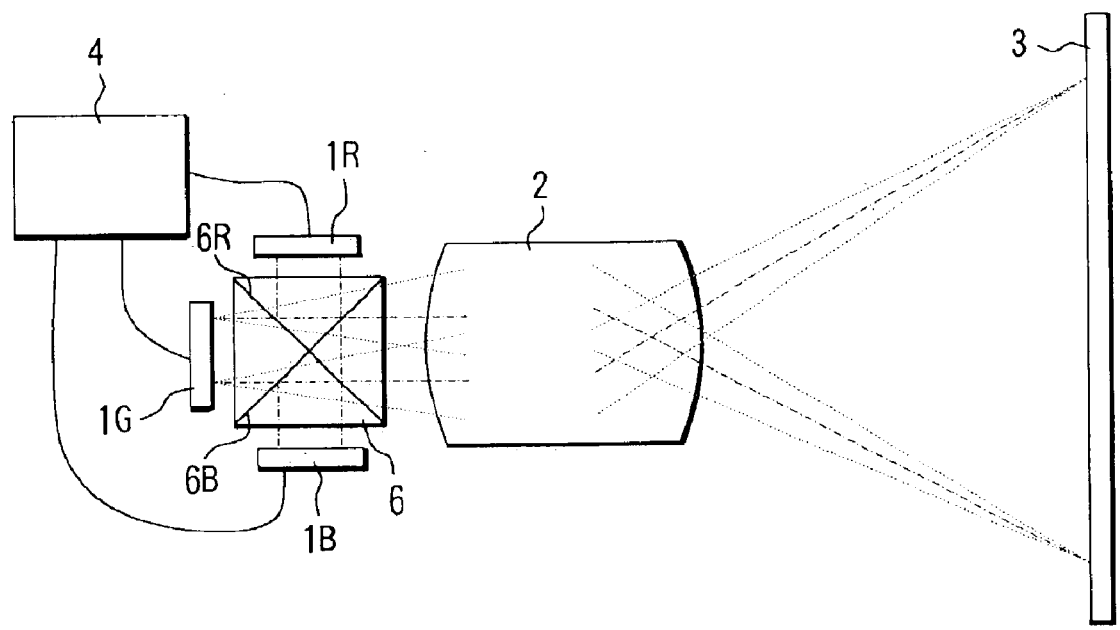
FIG. 2 is a sectional view of an optical system of a projector of Embodiment 2 of the present invention.

FIG. 2 is a sectional view of a main optical system forming a projector (projection type image display apparatus) of Embodiment 2 of the present invention.

EL elements 1R, 1G, and 1B emit light in colors administering the three additive primary colors of red, green, and blue. Each of these EL elements 1R, 1G, and 1B comprises a plurality of pixels which emit image information as light emission pattern information.

A controller 4 transmits electrical signals to the EL elements 1R, 1G, and 1B in response to inputted image signals from the image signal providing apparatus (denoted by IP in Embodiment 1) to control these EL elements 1R, 1G, and 1B. Based on electrical signals from the controller 4, each of the EL elements 1R, 1G, and 1B emits light in a color that the corresponding EL element handles.

Light emitted from the EL element 1 is color-combined by a wavelength-combining prism (color-combining prism) 6. The wavelength-combining prism 6 is generally called a cross dichroic prism, wherein a dichroic waveband separating film 6R that reflects red and transmits green and blue and a dichroic waveband separating film 6B that reflects blue and transmits green and red are disposed in a crossing manner. Therefore, green light is transmitted by the wavelength-combining prism 6 without receiving any influence.

By using this wavelength-combining prism 6, light (image information light) emitted from the EL element 1R that handles red is deflected toward the projection lens 2 by the dichroic waveband separating film 6R, and light (image information light) emitted from the EL element 1B that handles blue is deflected toward the projection lens 2 by the dichroic waveband separating film 6B. Light (image information light) emitted from the EL element 1G that handles green advances toward the projection lens 2 without receiving a deflecting effect.

The plurality of pixels disposed in the respective EL elements 1R, 1G, and 1B are mechanically or electrically adjusted so that pixels that are associated with each other overlap on a screen 3 with a predetermined accuracy. In place of the wavelength-combining prism 6, a three-piece prism or a four-piece prism that are frequently used for a received video light color separating optical system may be employed as well as the illustrated cross dichroic prism.

Light that has been wavelength-combined and modulated into color light by the wavelength-combining prism 6 is projected onto the screen 3 by the projection lens 2.

The screen 3 has light diffusibility on its surface, and an observer recognizes an image by observing light diffused and reflected on the screen 3.

The detailed structure of the EL elements 1R, 1G, and 1B is described later.

The projection type image display apparatuses of the abovementioned Embodiments 1 and 2 may use a rear-projection method or a front-projection method. Namely, the screen 3 that composes an image display system in conjunction with the projection type image display apparatus may be a reflection type or a transmission type. By using a screen 3 with predetermined diffusibility, an image display system by which an observer recognizes an image by directly observing the screen 3 can be composed, and by using a screen with directivity obtained by a hologram or Fresnel structure, an image display system which carries out image display at a specific position can be composed.

(EL Element)

Figure 3:
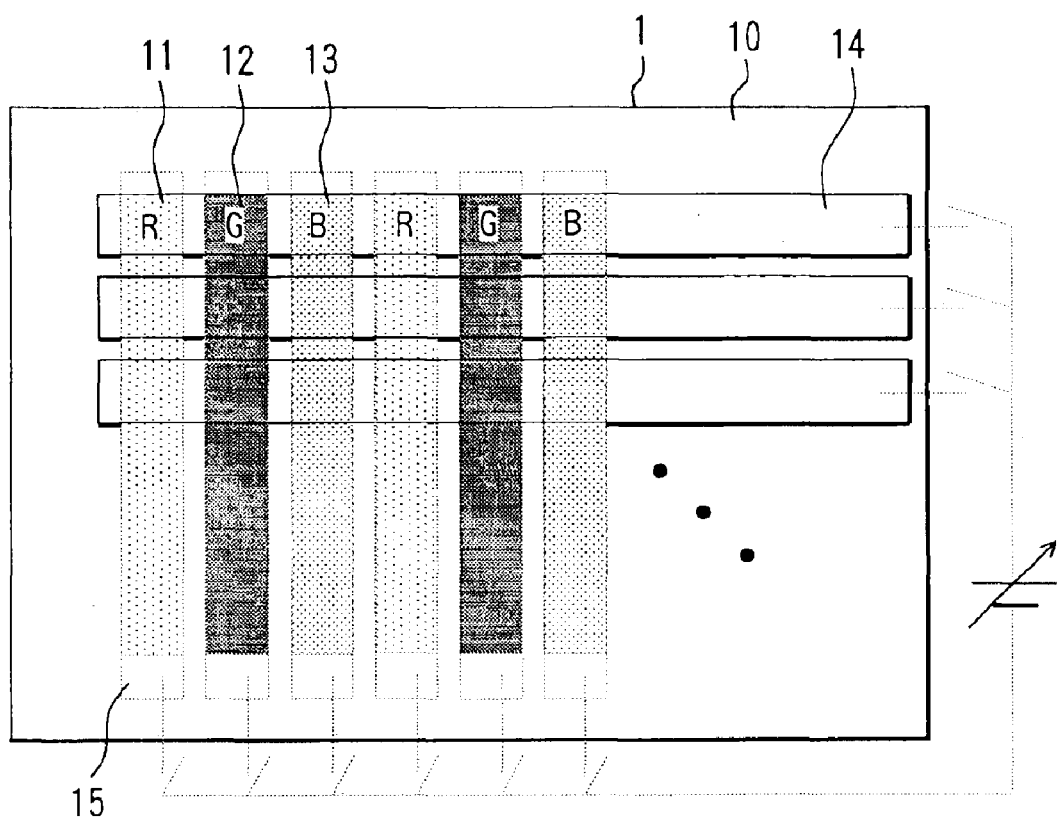
FIGS. 3(A) and 3(B) are schematic drawings of the main part of an EL element to be used in Embodiment 1.
Figure 3:
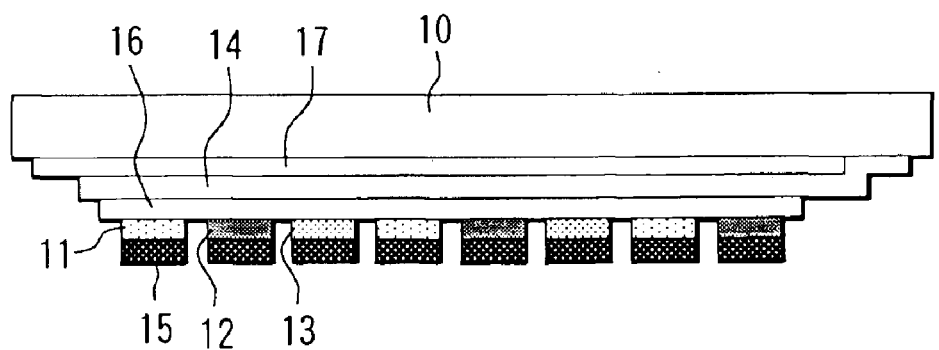

Next, the structure of the EL element used in Embodiment 1 is described with reference to FIGS. 3(A) and 3(B). The basic structure of the EL element 1 is as shown in FIG. 3(B), wherein a transparent glass substrate 10 is used as a base material, and EL materials 11, 12, and 13 are sandwiched and held between ITO (Indium Tin Oxide) transparent thin film electrodes 14 and metal thin film electrodes 15. In order to efficiently inject hole carriers into the EL materials 11, 12, and 13, hole transporting layers 16 are provided between the ITO transparent thin film electrodes 14 and EL materials 11, 12, and 13.

When it is used as a projection type modulating light source, in order to increase the percentage of harvesting emitted light by the projection lens 2 and to increase the photoelectric conversion efficiency, an optical resonance structure is formed by a dielectric multilayer reflecting mirror 17 provided at the outer side of the ITO transparent thin film electrode 14 and an optical reflecting surface of the metal thin film electrode 15. Thereby, the light emission direction is provided with directivity perpendicular to the glass substrate 10 by means of resonance although the condition does not bring about an induced emission action.

The basic structure of the EL element 1 is as mentioned above, and emission pixels are structured by means of a wiring matrix arrangement of the ITO transparent thin film electrodes 14 and the metal thin film electrodes 15.

A phosphorescent material which carries out emission by means of triplet excitons is provided as a luminous body in a luminescent layer. Red, green, and blue emission colors are determined by the phosphorescent material that is an EL material provided in the EL layer, for example, a disparate element structure of an iridium complex and a dielectric material for transporting electronic charge carriers. As shown in FIG. 3(A), by arranging the EL material 11 handling red light, the EL material 12 handling green light, and the EL material 13 handling blue light by turns, the EL element 1 which expresses full-color images is achieved.

On the other hand, patterning of the EL materials 11, 12, and 13 is normally carried out by coating the substrate with organic luminescent materials by means of vapor deposition method. Namely, to prepare the EL element 1 having three primary color emission pixels arranged, coating needless portions are masked for each color, and then three primary color (R, G, and B) EL materials are coated by liftoff processing, whereby pattern arrangement is carried out.

Figure 4:
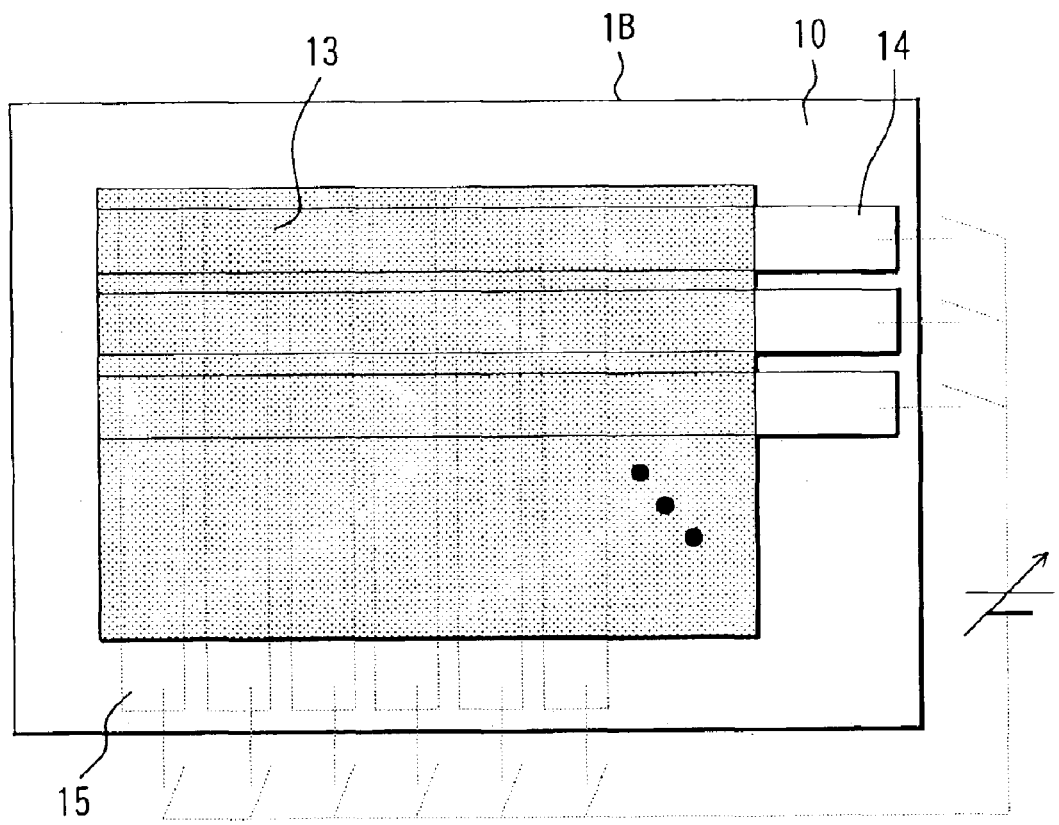
FIGS. 4(A) and 4(B) are schematic drawings of the main part of an EL element to be used in Embodiment 2.
Figure 4:
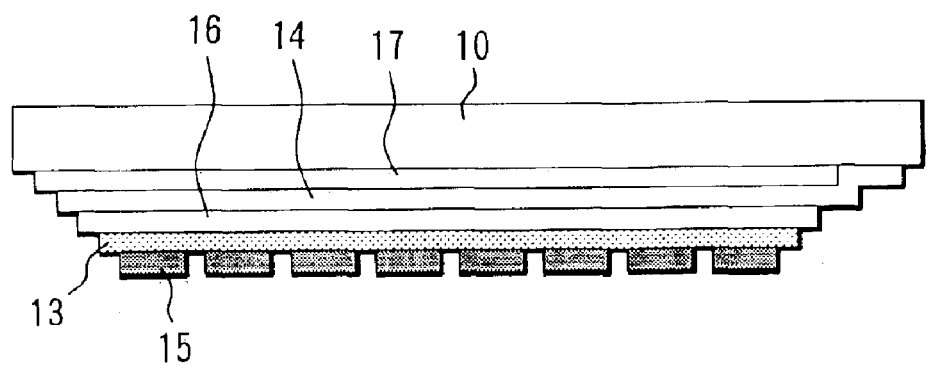

The EL elements 1R, 1G, and 1B used in Embodiment 2 are structured as shown in FIGS. 4(A) and 4(B) so that the structure of pattern arrangement of the three primary color EL materials is omitted from the structure of Embodiment 1. Although only the blue EL element 1B is shown in this figure, EL elements for other colors are also structured in the same manner.

The EL element 1R that emits red light uses the EL material 11 which emits red light, and the EL element 1G which emits green light uses the EL material 12 which emits green light. The EL element 1B that emits blue light uses the EL material 13 which emits blue light.

Next, emission state of the EL elements used in Embodiments 1 and 2 is described. To the EL elements, as a luminescent material, a phosphorescent material is applied which generates delayed light by recombination of excitons from the excited triplet state by means of electronic charge carrier injection, and emission is carried out by supplying a pulse current with a predetermined cycle to the EL layer.

Herein, an iridium complex is used as a luminescent material, and for an emission wavelength, a type of iridium complex is used in which a potential energy gap has been changed by molecules obtained by substituting a part of a complex base of the complex structure or molecules obtained by substituting terminal atoms. In some cases, a film structure is used which improves exciton generation efficiency by forming a double hetero potential structure including an electron transporting layer that simultaneously serves as a hole blocking layer and a hole transporting layer that simultaneously serves as an electron blocking layer.

The phosphorescent material used herein starts emission in response to pulse injection of electronic charge carriers, and takes 1 millisecond at most from peak emission to attenuation to the half emission amount. Furthermore, the phosphorescent material using an iridium complex emits phosphorescence in a condition where the emission half attenuation time is 10 microseconds or less in a case where the film thickness of the luminescent layer is set to 30 nm although the emission delaying attenuation time changes depending on the film thickness of the luminescent layer. When using a phosphorescent material or element structure which has an emission half attenuation time much longer than 1 millisecond and increasingly causes emission delays as the emission half attenuation time exceeds 10 milliseconds, several tens of milliseconds are required for turning-off, and emission during this period is visually recognized as an afterimage. Therefore, in a case of displaying a moving image, so-called movement tailing phenomenon occurs. Therefore, preferably, a phosphorescent material or element structure which takes a time shorter than 1 millisecond for half decay of phosphorescence is used.

On the other hand, as for phosphorescence that is emitted from the excited triplet state, quantum conversion efficiency theoretically becomes four times that of fluorescence that is emitted from the excited singlet state, so that a larger amount of emission can be converted with respect to the supplied electric power energy by using phosphorescent material, luminous efficiency becomes high, and bright display can be easily obtained in a case where an EL element is used as a modulating light source of a projection type display apparatus. Therefore, this is effective for improving the quality of projected images.

Figure 5:
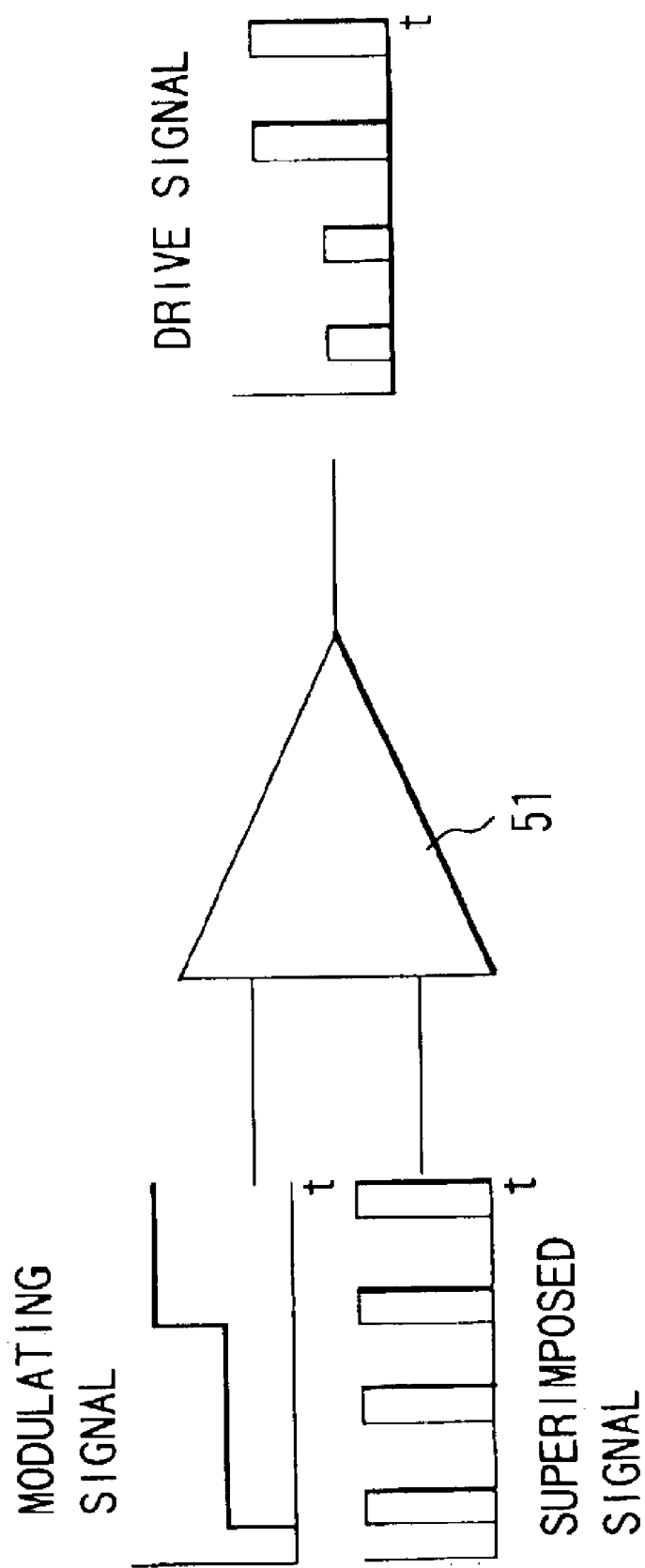
FIG. 5 is a diagram showing a method of superimposing an intermittent pulse signal on a modulated data signal.

Next, a method of turning the EL element 1 on is described with reference to FIG. 5. As shown in FIG. 5, data signals to be transferred to pixels of the respective EL elements are generated. Namely, a drive voltage signal as an AND signal is generated by an integrator 51 by using a modulating signal for modulating an emission intensity and a superimposing signal (intermittent turning-on signal) for pulse emission, and this drive voltage signal is transferred as the abovementioned data signal to the respective pixels. The drive voltage signal is applied to each pixel in response to scanning synchronization signals that are not shown corresponding to the pixel arrangement in the EL element 1.

Then, the drive voltage signal is converted into a saturation current value by a voltage-current converting circuit (not shown) formed of thin-film transistors in each pixel. An upper limit current from power supplied from an electronic charge carrier transfer line is supplied to the EL layer according to the saturation current value set by the drive voltage signal, whereby electronic charge carriers are injected and the pixel carries out emission.

Figure 6:
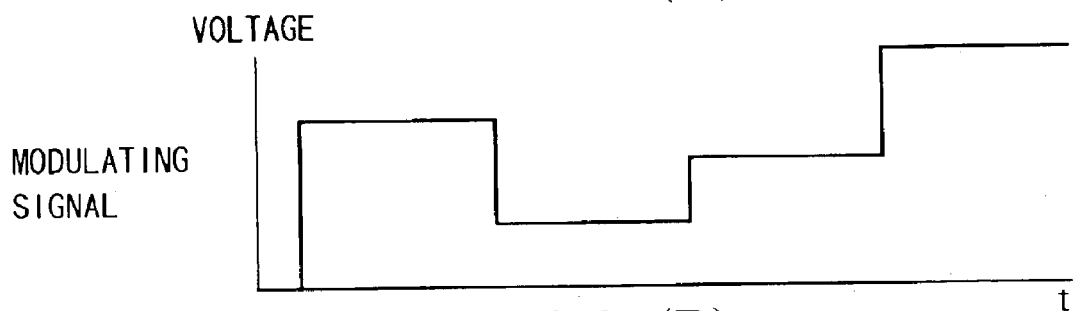
FIGS. 6(A) through 6(E) are timing charts showing factors related to emission changes from modulated data signals.
Figure 6:
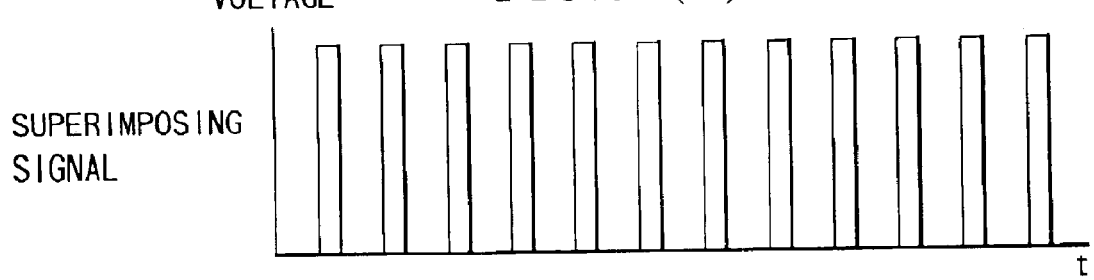
Figure 6:
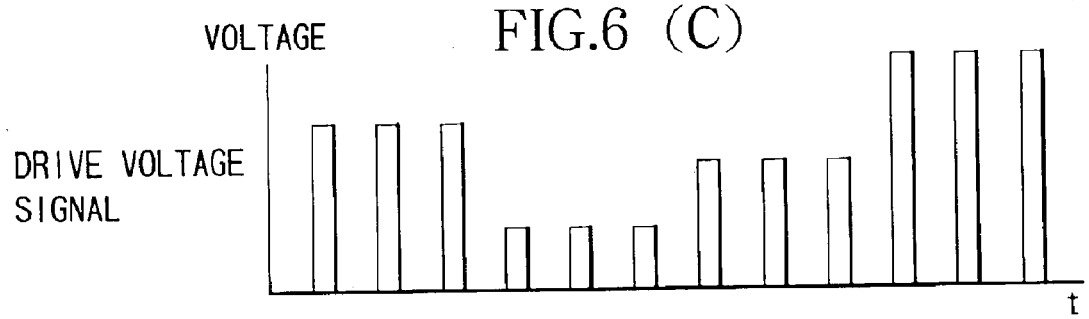
Figure 6:
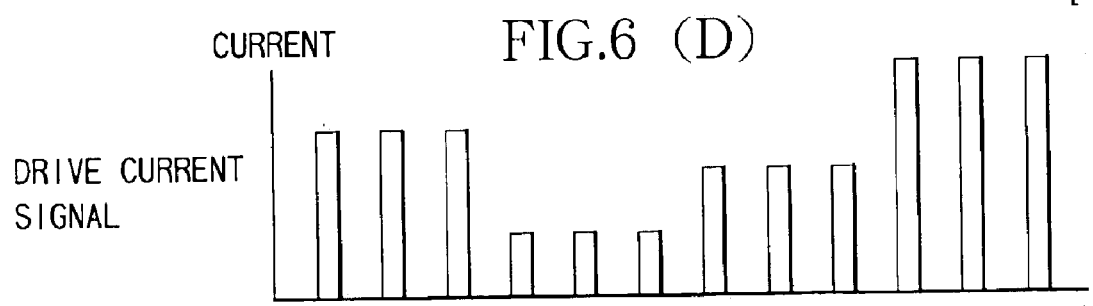
Figure 6:
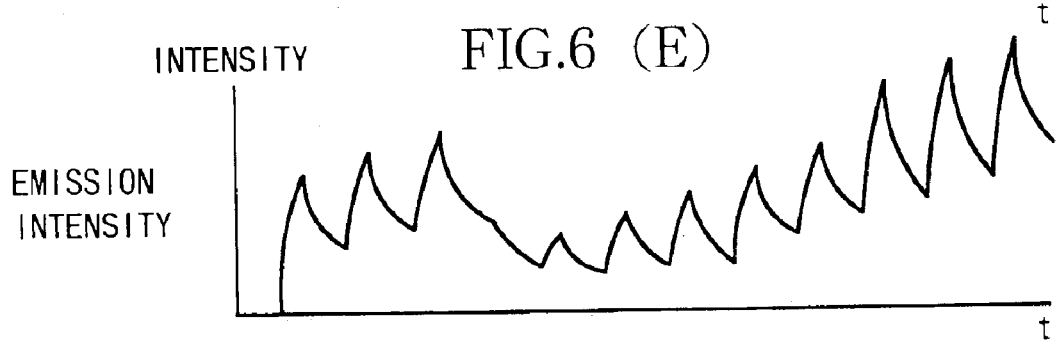

Next, the emission characteristics of the EL element with respect to the modulating signal in an optional pixel are described with reference to FIG. 6.

For each pixel, a modulating signal based on image signal from the image signal providing apparatus IP shown in FIG. 1 is generated as shown in FIG. 6(A), and a drive voltage signal shown in FIG. 6(C) is generated by superimposing the superimposing signal of FIG. 6(B) on the modulating signal of FIG. 6(A) with the integrator 51 described in FIG. 5. This drive voltage signal is transferred to each pixel in response to unillustrated scanning synchronization signals for operating the addresses of the EL elements, and converted into a signal of a current value as a drive current signal shown in FIG. 6(D). This drive current signal causes modulation of electronic charge carriers to be injected into the luminescent layer that emits phosphorescence of the EL element, whereby emission occurs. As mentioned above, the luminescent material causes time delayed emission of phosphorescence, so that the amplitude of emission intensity becomes small as shown in FIG. 6(E). Therefore, although the injected electronic charge carriers are turned on and off, the amplitude of emission luminance from the EL element is also reduced, and this suppresses flickering of emission.

Herein, as an actual superimposing signal, a rectangular wave with a ⅓ duty (turning-on time) at 1 MHz is used. The phosphorescence emission half attenuation time is approximately 800 nanoseconds and blank time (turning-off time) of the superimposing signal is 667 nanoseconds in one cycle, so that time setting is obtained in that the blank time of the superimposing signal is shorter than the phosphorescence emission half attenuation time.

On the other hand, the modulating clock frequency of the modulating signal for each pixel is 100 Hz, and the frequency difference from the superimposing signal is four power, and superimposing modulation much finer than the schematic diagram of FIG. 6(A) to FIG. 6(C) is carried out. By employing this modulating method, as disclosed in Japanese Patent Laid-Open No. H07(1995)-230880, it becomes possible to significantly suppress lowering in luminance due to heating deterioration of the organic EL materials in pulse intermittent emission. Furthermore, since emission pulse width modulation of the image frame display period is not carried out, a problem in that a display image with high contrast flickers can be eliminated.

Next, a drive method for the organic EL panels (or pixels) in this embodiment is described with reference to FIGS. 7(A) to (D) and FIGS. 8(A) to (D). This drive method suppresses the peak power consumption to be smaller than when R, G, and B are simultaneously turned on, by shifting the input timings of the injecting current pulses of R (red), G (green), and B (blue) among pixels or organic EL panels that handle the three primary colors, by shifting the phases of intermittent turning-on signals (superimposing signals) with predetermined cycles to be superimposed on modulating signals.

Figure 7:
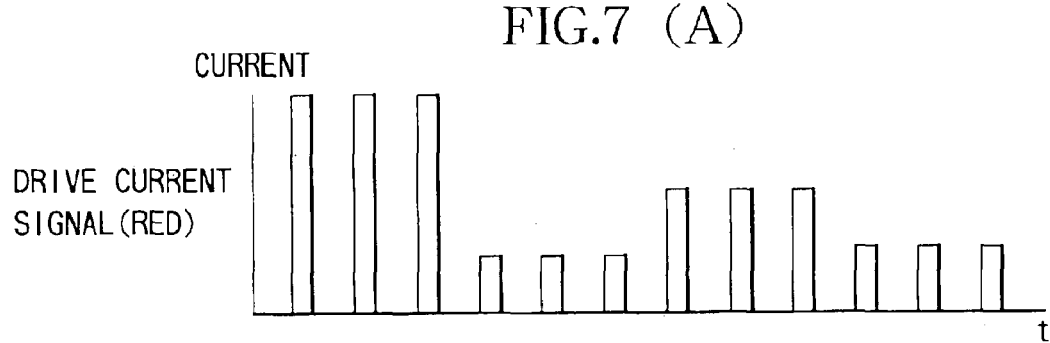
FIGS. 7(A) through 7(D) are diagrams showing time correlation of current signals to be injected for the respective primary colors of a first example.
Figure 7:
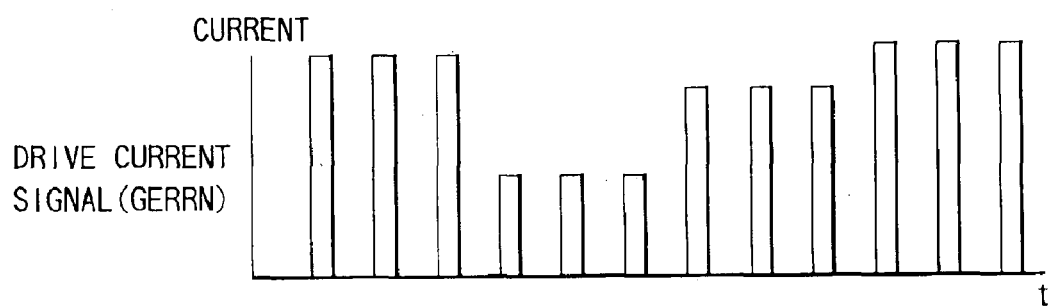
Figure 7:
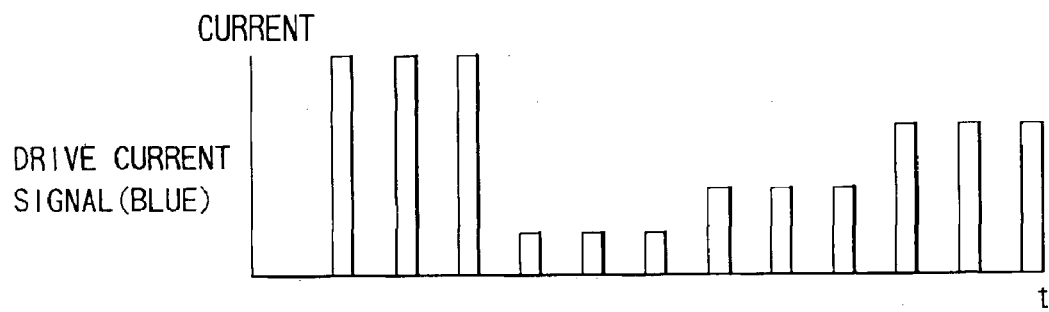
Figure 7:
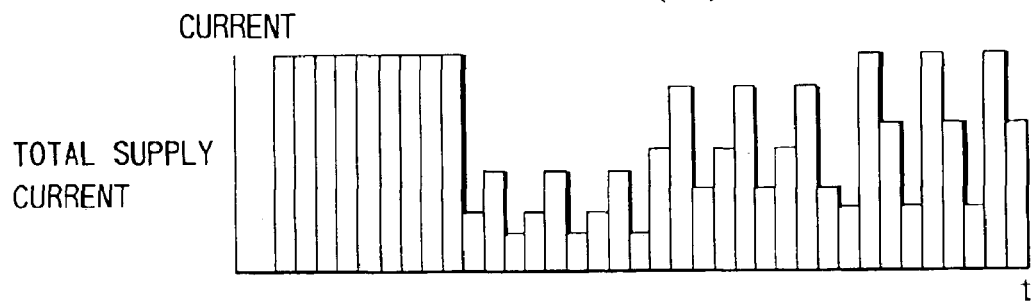

FIGS. 7(A), (B), and (C) show time charts of drive current signals as electronic charge carrier injection amounts of the respective pixels or respective EL elements handling red, green, and blue, respectively. The pulse duty cycle of the superimposing signal is ⅓, and output phases to the respective R, G, and B pixels or EL elements are shifted by ⅓ (⅔π) once per cycle.

At the initial point in the time base, a full-on state in white is shown, and after this, a state of different colors displayed is shown.

FIG. 7(D) is a time chart of the total currents supplied to the individual pixels or EL elements handling the three primary colors R, G, and B. In comparison with a case where the superimposing pulses are synchronized among three colors and turned on, the peak of the total supplied current can be reduced to ⅓. Furthermore, in comparison with a case of synchronous turning on where the superimposing pulse duty cycle is set to ½, the peak of the total supplied current can be reduced to ½.

Figure 8:
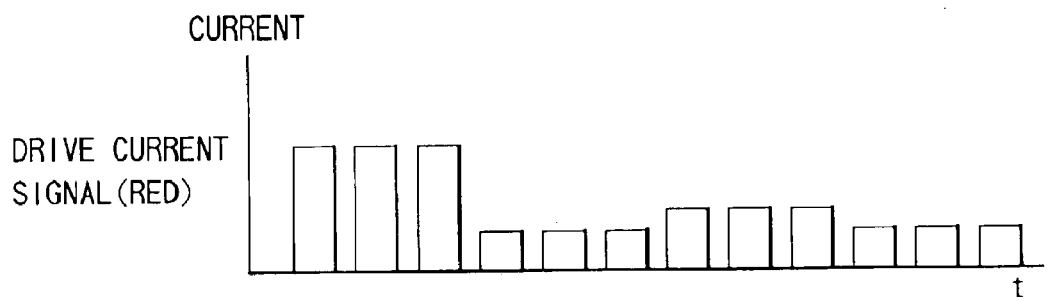
FIGS. 8(A) through 8(D) are diagrams showing time correlation of current signals to be injected for the respective primary colors of a second example.
Figure 8:
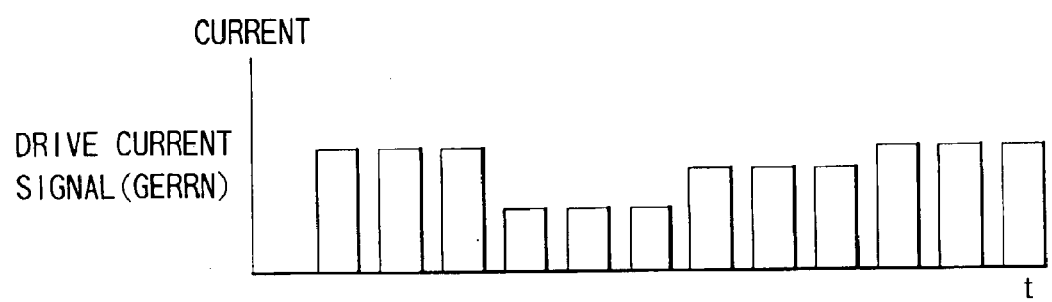
Figure 8:
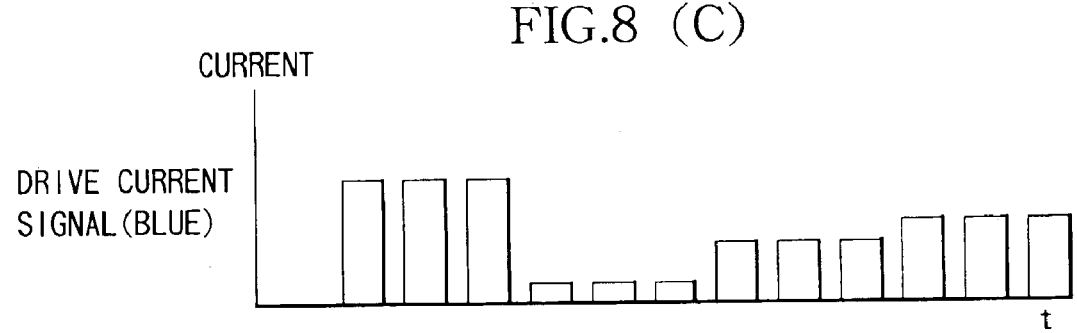
Figure 8:
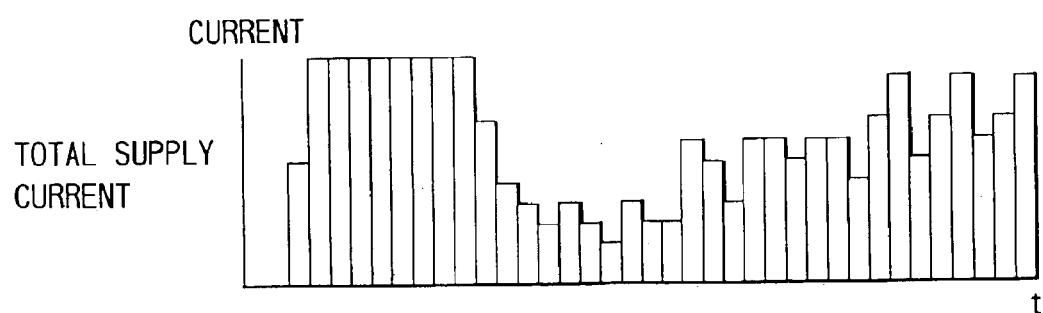

In FIGS. 8(A) to (D), the superimposing signal pulse duty cycle is set to ⅔ to set timings so that output phases to the respective pixels or EL elements handling R, G, and B are shifted by ⅓ (⅔π) once per cycle. FIGS. 8(A), (B), and (C) show time charts of drive current signals as electronic charge carrier injection amounts into the pixels or EL elements handling red, green, and blue in the same manner as in FIGS. 7(A) to (C). In the initial point in the time base, a full-on state in white is shown, and after this, a state of different colors displayed is shown.

FIG. 8(D) shows a time chart of the total currents supplied to the pixels or EL elements handling the three primary colors of R, G, and B. In comparison with a case where the superimposing pulses are synchronized among three colors and turned on, the peak of the total supplied current can be reduced to ⅔. Furthermore, in comparison with a case of synchronous turning on where the superimposing pulse duty cycle is set to ½, the peak of the total supplied current can be reduced to ½.

Furthermore, the duty cycles of the injected current pulses of two colors among the three primary colors R, G, and B are set to ½ to set timings so that emission is carried out in a condition where output phases to pixels or EL elements of the two colors among the three primary colors are shifted by ½ once per cycle (inverted corresponding to the inversion of the π phase), whereby the peak of the total supplied current can be reduced to ⅔ in comparison with a case of synchronous turning on where the superimposing pulse duty cycle is set to ½.

As described above, in Embodiments 1 and 2, a phosphorescent material which emits phosphorescence by priority, that is emitted from an excited triplet state, is used as an EL material to be used for the luminescent layer of the EL element. And emission amounts from the respective pixels are modulated by modulating current values to be injected into the respective pixels depending on image signals. Furthermore, intermittent turning-on signals with predetermined cycles are superimposed on emission amount modulating signals. Therefore, the following effects are obtained.

That is, heat radiation is promoted, deterioration of the structure and characteristics of organic thin films are suppressed, whereby lowering in luminous efficiency of the organic EL elements of the EL element is suppressed.

Furthermore, it becomes unnecessary to carry out pulse width modulation, and the emission luminance amplitude from the EL element is also reduced, whereby flickering of the displayed image can be suppressed.

Furthermore, timing control is carried out for the intermittent turning-on signal to be superimposed on the modulating signals so that in the pixels or organic EL panels handling the three primary colors, temporal overlap of injected current pulses for R (red), G (green), and B (blue) among the colors is eliminated or reduced, whereby the peak power consumption is reduced, the load on the power source is reduced, and the maximum power consumption is reduced.

As a method of cooling the EL element, in place of the method using a Peltier element, it is also allowed that cooling is carried out by thermal diffusion by using a metal or ceramic with high heat conductivity and ventilation or circulation of a liquid refrigerant.

The structures shown in Embodiment 1 and 2 are not limited to projectors, but can be applied to head mounted displays or head-up displays with which virtual images formed by the EL element are observed.

Embodiment 3

Figure 9:
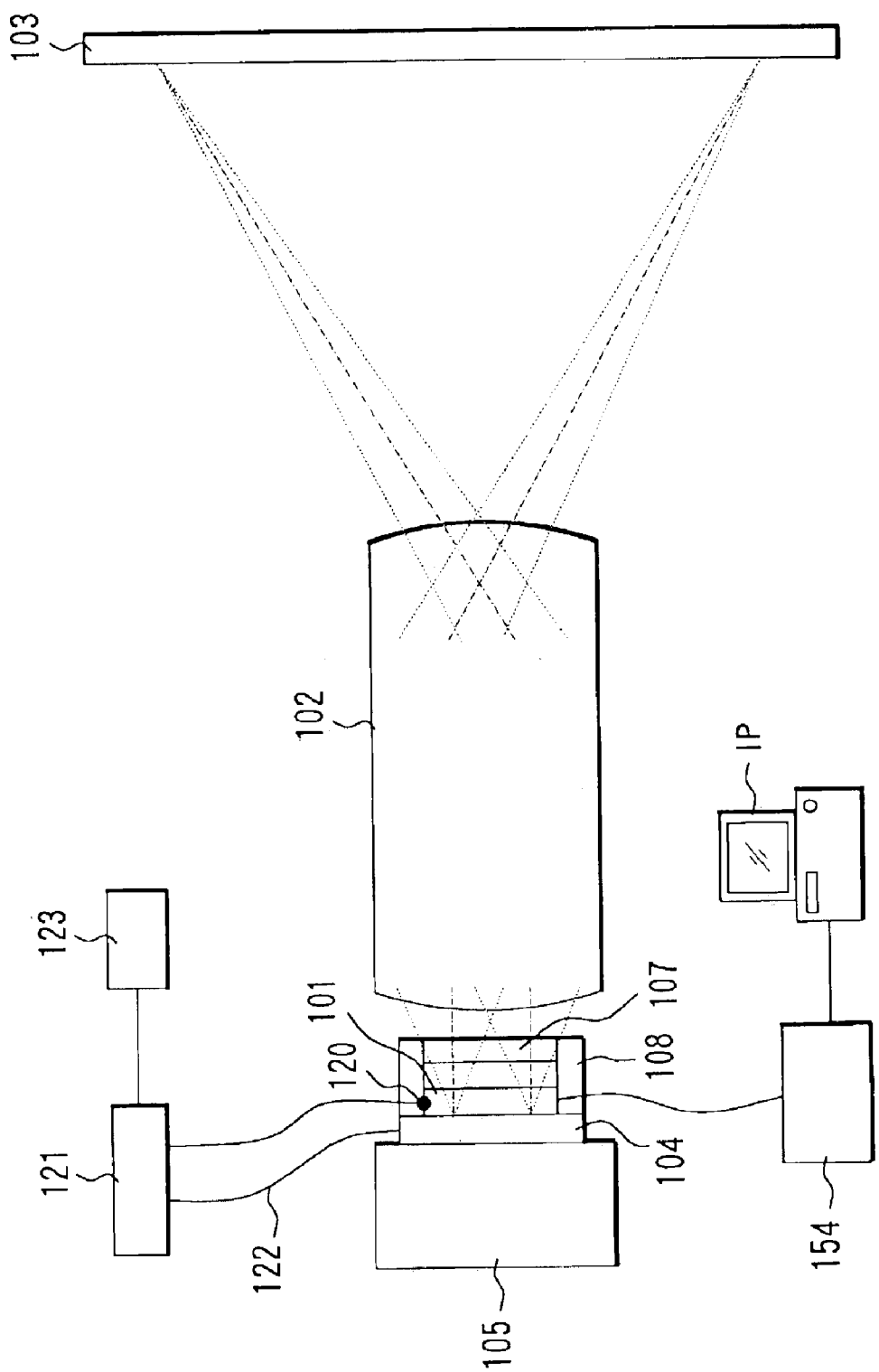
FIG. 9 is a schematic diagram of a projector of Embodiment 3 of the present invention.

FIG. 9 shows a main optical system forming a projector (projection type image display apparatus) of Embodiment 3 of the present invention.

In this figure, an electroluminescence (EL) element 101 emits light containing image information. This EL element 101 comprises a plurality of pixels which emit light so as to express image information as light emission pattern information.

The EL element 101 is electrically controlled based on electrical signals from a display controller 154. Image signals are inputted into the display controller 154 from an image signal providing apparatus IP such as a personal computer, a DVD player, a VCR, a video camera, a television, or a unit of an antenna to receive image signal and a tuner. The controller 154 provides electrical signals for making the EL element 101 to carry out emission based on inputted image signals and to display an image to the EL element 101 (the same applies to the next Embodiment 4 although it is not shown). Thereby, the EL element 101 emits image information light (modulated light). The detailed structure of the EL element 101 will be described later.

Light emitted from the EL element 101 passes through a space that is isolated from the outside air by a window 107 and a sealing member 108 and filled with nitrogen or dry air, and the window 107, and then projected onto a screen 103 through a projection lens 102.

The screen 103 has predetermined light diffusibility on its surface. Therefore, an observer can observe a projected image by viewing light diffused and reflected on the screen 103.

On the other hand, energy conversion loss due to photoelectric conversion at the EL element 101 is mostly converted into heat energy. In this embodiment, a Peltier element 104 as a cooling unit is attached to the back surface (surface other than light emitting surface) of the EL element 101.

Concretely, a temperature gradient is generated by means of the Seebeck effect, and the low temperature gradient surface of the Peltier element 104 which shows a cooling effect from one surface is closely fixed to the back surface of the EL element 101. Thereby, the EL element 101 can be cooled.

Reference numeral 121 denotes a temperature controller. A thermocouple (element temperature detector) 120 is connected to this temperature controller 121, and is in contact with the EL element 101. Thereby, the temperature controller 121 can monitor the temperature of the EL element 101.

Furthermore, an outside air temperature sensor 123 which detects the outside air temperature as an environmental temperature is connected to the temperature controller 121.

FIG., 13(B) is a flow chart for controlling the temperature of the EL element 101 by the temperature controller 121. First, at Step 1, the temperature controller 121 detects a potential generated from the thermocouple 120 and a potential from the outside air temperature sensor 123.

Next, at Step 2, the temperature controller 121 calculates a temperature difference of the EL element 101 from the outside air temperature by comparing these potentials.

And, at Step 3, the temperature controller 121 determines whether the temperature difference of the EL element 101 from the outside air temperature is within a predetermined range with respect to a predetermined control target value, or not.

If the temperature difference is not within the predetermined range at Step 3, then, at Step 4, the temperature controller 121 determines whether the temperature difference is smaller, than the control target value or not.

If the temperature difference is smaller than the control target value (that is, the temperature of the EL element 101 is excessively high with respect to the outside air temperature), then, at Step 5, the temperature controller 121 detects a potential change gradient generated by the thermocouple 120 and supplies electric power to the Peltier element 104 via a power supply line 122 so that the temperature difference of the EL element 101 from the outside air temperature falls within a predetermined range. Thereby, the temperature of the EL element 101 is controlled so as to suppress the difference in temperature thereof from the outside air temperature within the predetermined range.

On the other hand, the high temperature gradient surface of the Peltier element 104 opposite to the EL element 101 is forcibly cooled by using the outside air by a ventilation fan 105 as a cooling unit as shown in FIG. 9.

In this case, a heatsink with high heat conductivity made from a metal or ceramic is provided on the high temperature gradient surface of the Peltier element 104 so as to radiate heat by means of air convection by the ventilation fan 105.

Embodiment 4

Figure 10:
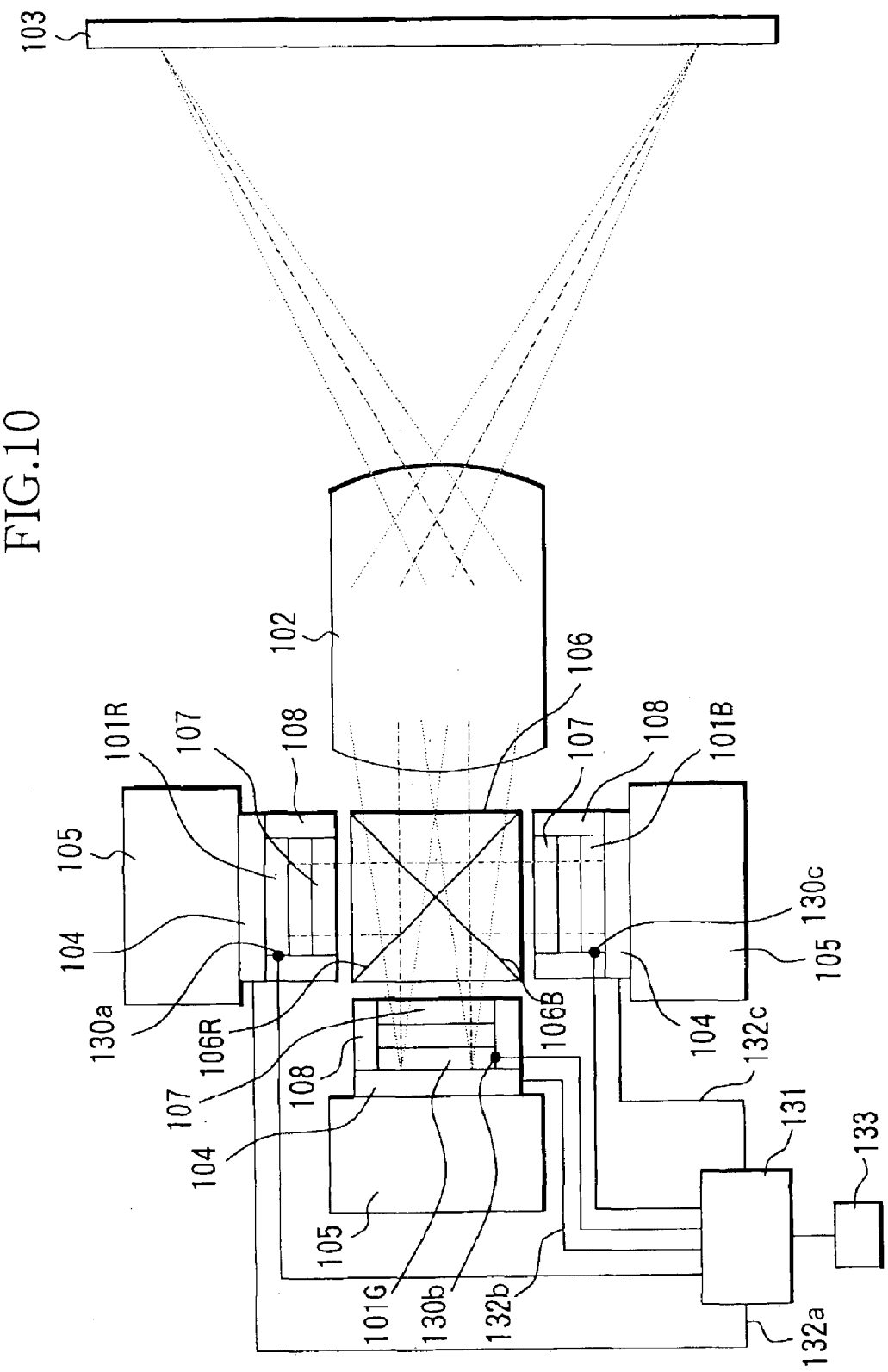
FIG. 10 is a schematic diagram of a projector of Embodiment 4 of the present invention.

FIG. 10 shows a sectional view of a main optical system forming a projector (projection type image display apparatus) of Embodiment 4 of the present invention.

In this figure, EL elements 101R, 101G, and 101B handle the three additive primary colors of red, green, and blue and emit light in the corresponding colors, respectively. Each EL element comprises a plurality of pixels which emit light so as to express image information as light emission pattern information. Each EL element is electrically controlled based on electrical signals from the display controller (denoted by the reference numeral 154 in Embodiment 3). The display controller supplies electrical signals to the respective EL elements, which make the respective EL elements to emit light based on image signals inputted from the image signal providing apparatus (denoted by IP in Embodiment 3) so as to display image information. Thereby, three EL elements 101R, 101G, and 101B emit image information light (modulated light) in the corresponding colors.

A detailed structure of the EL elements 101R, 101G, and 101B is described later.

Light emitted from the EL elements 101R, 101G, and 101B passes through spaces that are provided for the respective EL elements, and isolated from the outside air by windows 107 and sealing members 108 and filled with nitrogen or dry air, and the windows 107, and then color-combined by a wavelength-combining (color-combining) prism 106.

The wavelength-combining prism 106 is generally called a cross dichroic prism, and is formed by arranging a dichroic waveband separating film 106R that reflects red and transmits cyan and a dichroic waveband separating film 106B that reflects blue and transmits yellow in a crossing manner. The wavelength-combining prism 106 has characteristics so as to transmit green light without influencing it.

By using this wavelength-combining prism 106, light (image information light) emitted from the EL element 101R that handles red is deflected toward the projection lens 102 by the dichroic waveband separating film 106R, and light (image information light) emitted from the EL element 101B that handles blue is deflected toward the projection lens 102 by the dichroic waveband separating film 106B. Furthermore, light (image information light) emitted from the EL element 101G that handles green advances toward the projection lens 102 without receiving a deflecting effect.

The plurality of pixels arranged in each of the EL elements 101R, 101G, and 101B are mechanically or electrically adjusted so that pixels associated with each other overlap each other on the screen 103 with a predetermined accuracy. In place of the wavelength-combining prism 106, a 3-piece prism or a 4-piece prism that is generally used for a video received light color separation optical system may be used as well as the illustrated cross dichroic prism.

Color image information light (modulated light) that has been combined by a wavelength-combining prism 106 is projected onto the screen 103 through the projection lens 102.

The screen 103 has light diffusibility on its surface. Therefore, an observer can observe the projected image by viewing the light diffused and reflected on the screen 103.

On the other hand, a Peltier element 104 and a ventilation fan 105 as a cooling unit are provided on the back surface of each of the EL elements 101R, 101G, and 101B.

Reference numeral 131 denotes a temperature controller. To this temperature controller 131, thermocouples (element temperature detectors) 130a, 130b, and 130c are connected, and these thermocouples 130a, 130b, and 130c are in contact with the EL elements 101R, 101G, and 101B, respectively.

Thereby, the temperature controller 131 can individually monitor the temperatures of the respective EL elements 101R, 101G, and 101B.

Furthermore, to the temperature controller 131, an outside air temperature sensor 133 which detects an outside air temperature as an environmental temperature is connected.

The temperature controller 131 detects temperature differences of the respective EL elements 101R, 101G, and 101B from the outside air temperature by comparing potentials generated from the thermocouples 130a, 130b, and 130c and a potential from the outside air temperature sensor 133. Furthermore, the temperature controller 131 detects potential change gradients of the thermocouples 130a, 130b, and 130c and controls the power to be supplied to the Peltier element 104 via power supply lines 132a, 132b, and 132c attached to the respective EL elements 101R, 101G, and 101B so that the temperature differences of the EL elements 101R, 101G, and 101B from the outside air temperature fall within a predetermined range. Thereby, the three EL elements 101R, 101G, and 101B are individually and forcibly cooled so that their temperature differences from the outside air temperature fall within a predetermined range. This temperature control is performed according to the flow chart described in Embodiment 4 (FIG. 13(B)).

On the other hand, the high temperature gradient surface of the Peltier element 104 opposite the EL elements 101R, 101G, and 101B is forcibly cooled by using the outside air by a ventilation fan 105.

(EL Element)

Figure 11:
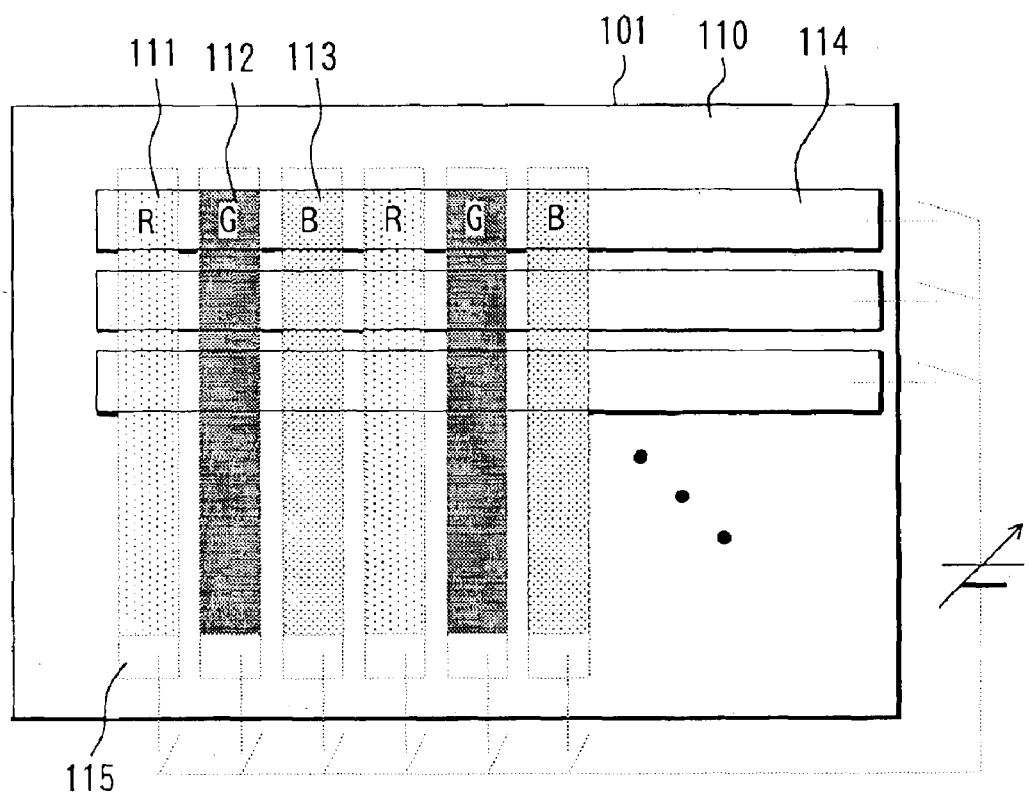
FIG. 11 is a schematic diagram of an EL element to be used in Embodiment 3.
Figure 11:
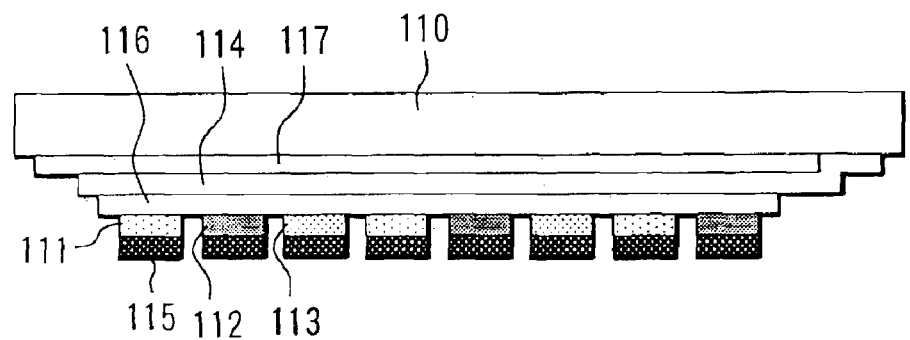

Next, the structure of the EL element used in Embodiment 3 is described with reference to FIGS. 11(A) and (B). In the basic structure of the EL element 101, as shown in FIG. 11(B), a transparent glass substrate 110 is used as a base material, and thin film EL material layers 111, 112, and 113 are sandwiched by ITO (indium tin oxide) transparent thin film electrodes 114 and metal thin film electrodes 115. In order to efficiently inject only hole carriers into the EL materials, a hole transporting layer 116 is disposed between the ITO transparent thin film electrodes 114 and thin film EL material layers 111, 112, and 113.

When it is used as a projection type modulating light source, in order to increase the percentage of harvesting emitted light by the projection lens and to increase the photoelectric conversion efficiency, a dielectric multilayer reflecting half mirror layer 117 is provided at the outer side of the ITO transparent thin film electrodes 114, and an optical resonance structure is formed by the dielectric multilayer reflecting half mirror layer 117 and the light reflecting surface of the metal thin film electrode 115. Thereby, light emission is provided with directivity perpendicular to the glass substrate 110 by means of resonance although the condition does not bring about an induced emission action.

This simultaneously achieves a band narrowing effect on emission wavelength spectrum, and an emission light wavelength can be set by designing the resonance distance. The light emitting surface is at the transparent glass substrate 110 side. The above is a description of the basic structure of EL element 101.

Each emission pixel is formed by a wiring matrix arrangement of the ITO transparent thin film electrode 114 and the metal thin film electrode 115, and the emission wavelength of 1 nanometer order is adjusted by the resonance mirror pitch, however, emission colors such as red, green and blue are determined by the EL materials. As shown in FIG. 11(A), by arranging the EL material 111 handling red light, EL material 112 handling green light by turns, and EL material 113 handling blue light, the EL element 101 which expresses full-color images is achieved.

On the other hand, patterning of the EL materials 111, 112, and 113 is generally carried out by coating fluorescent materials by means of vapor deposition method. Namely, to prepare the EL element in which three primary color emission pixels are arranged, coating needless portions are masked for each color by means of mask pattern shields or resist patterning, and in the case of resist patterning, three primary color EL materials are successively coated by means of liftoff processing, whereby pattern arrangement is performed.

Figure 12:
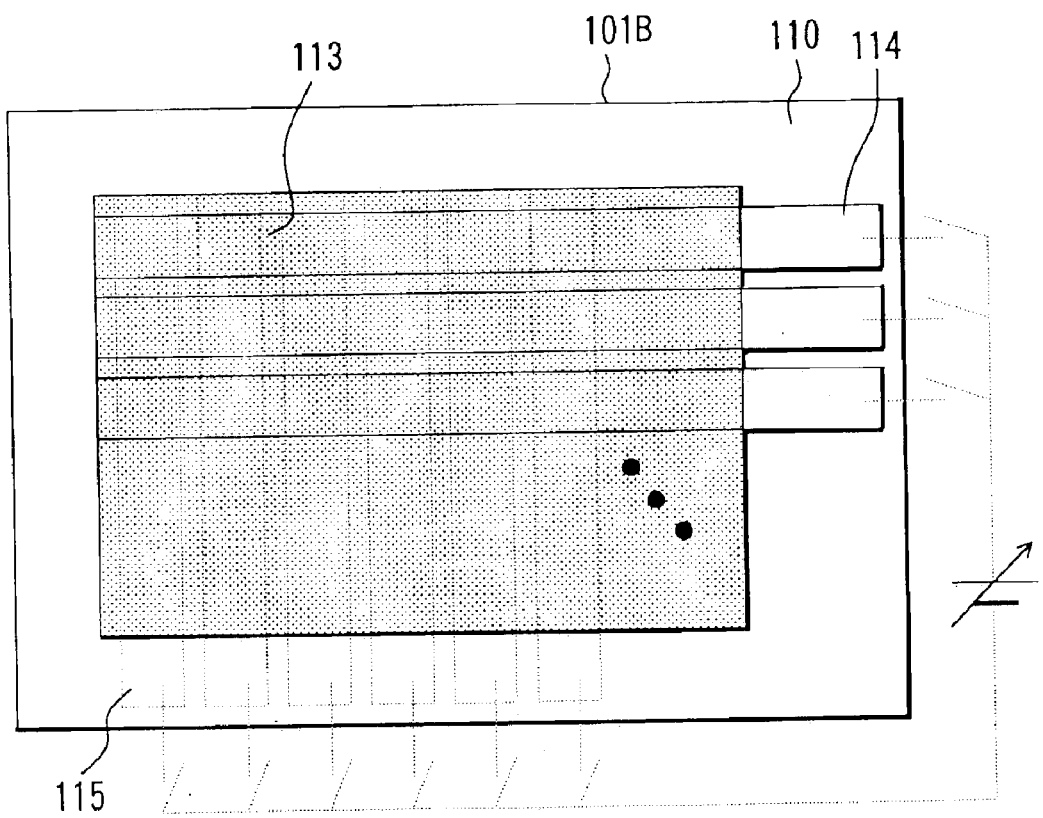
FIG. 12 is a schematic diagram of an EL element to be used in Embodiment 4.
Figure 12:
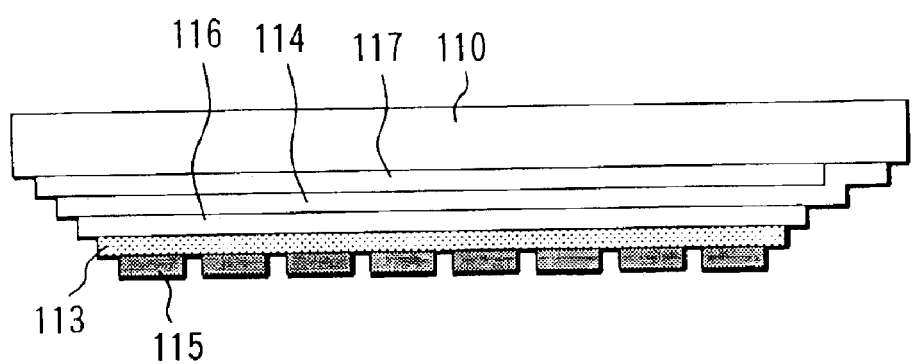

The structure of the EL elements 101R, 101G, and 101B used in Embodiment 4 is achieved by omitting pattern arrangement of three primary color EL materials in the EL element 101 used in Embodiment 3 as shown in FIGS. 12(A) and (B). In these figures, only the EL element 101B for blue is shown, however, EL elements for other colors are structured in the same manner.

The EL element 101R is formed by arranging the EL material 111 handling red, the EL element 101G is formed by arranging the EL material 112 handling green, and the EL element 101B is formed by arranging the EL material 113 handling blue.

Figure 13:
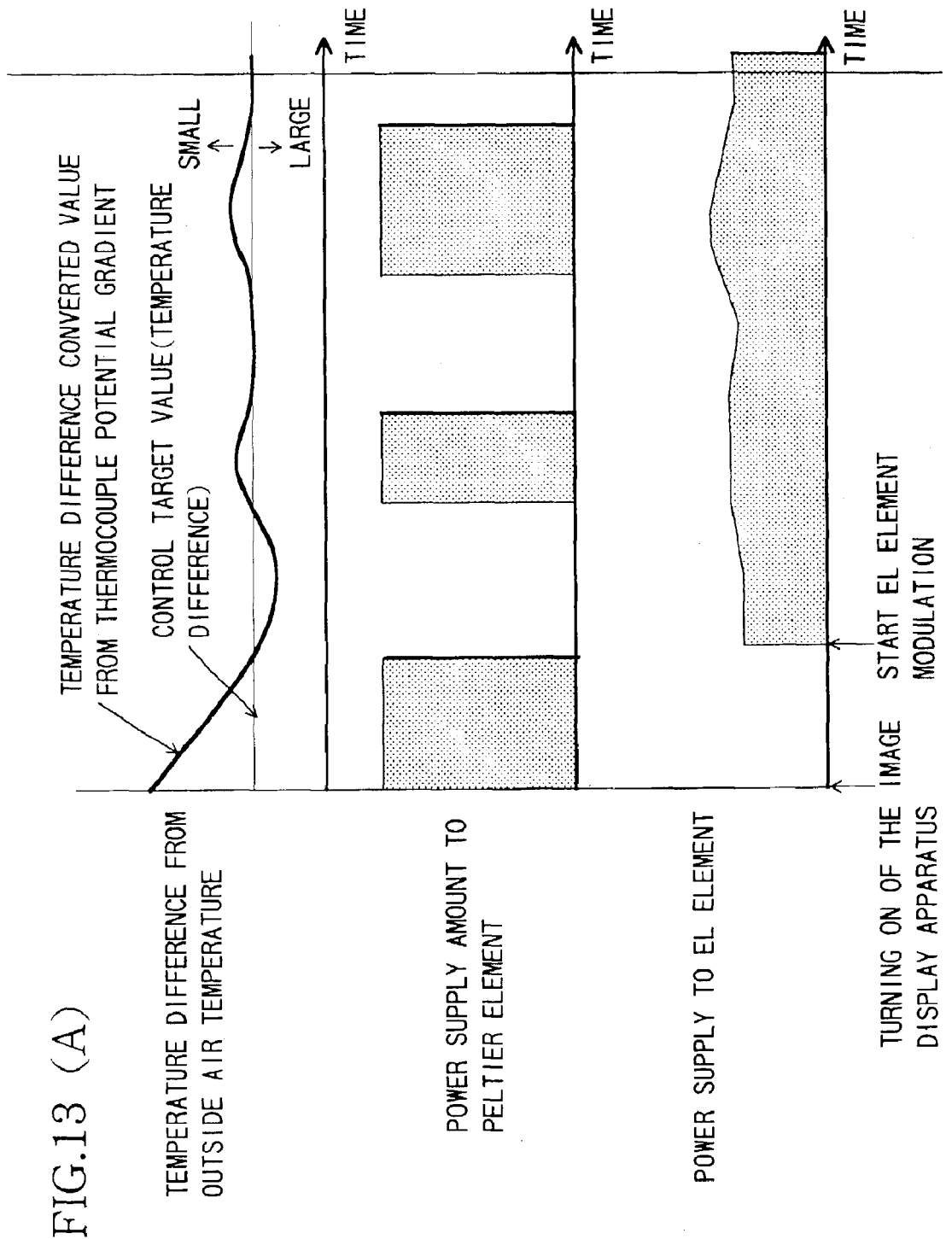
FIG. 13(A) is a diagram showing a temperature control sequence of the EL elements of Embodiments 3 and 4.
FIG. 13(B) is a flow chart for a temperature control of the EL element.
Figure 13:
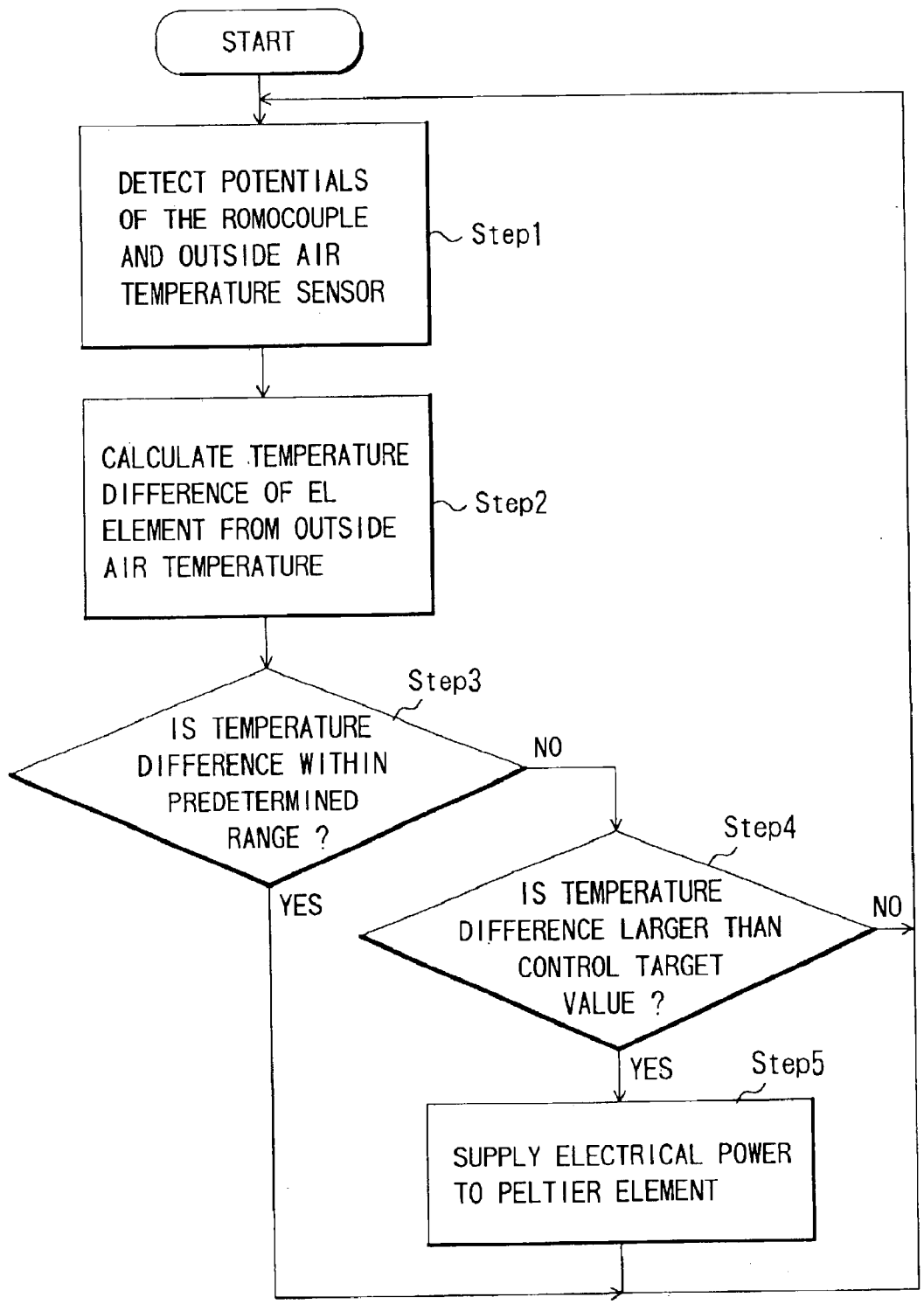

Next, a concrete example of the temperature control for the EL elements in Embodiments 3 and 4 is described with reference to FIG. 13(A).

When the power source of the projector is turned on, the temperature controller (121, 131) supplies electric power to the Peltier element 104 to cool the EL element having a temperature corresponding to the room temperature environment.

Herein, as for the cooling rate, sudden cooling causes a slight amount of liquefaction of water vapor contained in gases sealed inside the window 107, glass substrate 110, and sealing member 108, so that cooling is carried out with a predetermined temporal gradient. In this predetermined temporal gradient, the cooling rate limit value changes depending on the sealed gases, and in this embodiment, the maximum value of the power supply amount to the Peltier element 104 is set so as to obtain a cooling rate of −1° C. per 10 seconds as the maximum gradient.

Next, when a temperature difference between a temperature of the EL element detected by the thermocouple (120, 130a, 130b, 130c) and the environmental temperature (outside air temperature) detected by the outside air sensor reaches a predetermined control target value (in this embodiment, −15° C.), the temperature controller stops the power supply to the Peltier element 104. Thereby, preparation for the EL element to emit light is completed, and then the EL element carries out pattern modulating emission in response to image signals. Additionally, the abovementioned control target value has a certain range (predetermined range described in FIG. 13(B)) in actuality.

By overshoot of cooling the EL element, the EL element is temporarily cooled to a degree at which the temperature difference exceeds the control target value, however, in response to turning on of the EL element, heat energy is generated, and the temperature of the EL element starts increasing and the temperature difference becomes reduced. Then, when the temperature difference becomes smaller than the control target value by increasing the temperature of the EL element again, the temperature controller restarts power supply to the Peltier element 104 to cool the EL element. By repeating such feedback control, the temperature difference between the temperature of the EL element and the outside air temperature is maintained within the predetermined range with respect to the control target value.

Since image signals to be supplied to the EL element are not at a unique amount, heat energy generated from the EL element is not constant. Therefore, it is preferable that a feedback system is structured while monitoring the temperature of the EL element with a thermocouple or a radiation heat system, etc.

On the other hand, if feedback control is applied to the EL element at an absolute temperature, when the outside air temperature becomes high, air with a high water vapor content enters and causes dew condensation on the surface of the window 107. This is not good.

Next, an effect of cooling control of the EL element is described. Herein, a case is described where, as organic EL fluorescent materials, benzoxazole zinc complex is used for a blue luminous body, tris-(8-hydroxiquinoline)aluminum is used for a green luminous body, and DCM, etc. is used for a red luminous body.

With the projection type image display apparatus, in order to obtain a screen illuminance of 1000 luxes when an image displayed by an EL element with a diagonal 2-inch XGA pixel arrangement is enlarged and projected on a diagonal 50-inch screen, an emission amount of approximately one hundred thousand $cd/m^2$ from the EL element is required since the EL element has a resonance structure with forward emission characteristics and makes it possible to achieve high light harvesting efficiency of 50% or more by the projection lens 102.

This is instantaneously achieved by supplying 20 times of the electronic charge carrier injection amount, that is, 2 $A/cm^2$. However, the electrical energy is mostly converted into heat energy, so that the EL element rapidly raises its temperature by means of self-heating, and the probability of exciting the organic fluorescent materials as EL materials into an activated state rapidly increases. This causes collapse of the fluorescent material organic molecules, and the time of half decay of the photoelectric conversion efficiency exponentially attenuates.

As an example, in a case where the temperature of the EL element is substantially controlled to 15° C. under a condition where the outside air temperature is set to 30° C. and the control target temperature difference is set to 15° C., an organic fluorescent material having an excitation band in the visible light range has activation energy of approximately 50 kcal/mol or more. Therefore, the chemical reaction rate is reduced to approximately 1/10 of that in an environment of an ordinary temperature of 23° C. Therefore, the photoelectric conversion efficiency half attenuation time is lengthened to several ten thousands of hours, and the display illumination quality of the projection type image display apparatus can be maintained for 1 year or more.

The projection type image display apparatuses of Embodiments 3 and 4 may be either a rear-projection type or a front-projection type. Namely, a screen 103 composing the image display system in conjunction with the projection type image display apparatus may be either a reflection type or a transmission type. Furthermore, an image display system by which an observer recognizes an image by directly viewing the screen 103 can be composed by using a screen 103 with predetermined diffusibility, and an image display system which carries out image display at a specific position can be composed by using a screen with directivity obtained by a hologram or a Fresnel structure.

Furthermore, the present invention is not limited to the projection type image display apparatuses of Embodiments 3 and 4, but can also be applied to head mounted displays and head-up displays with which virtual images formed by an EL element are observed.

As described above, according to Embodiments 3 and 4, by cooling the organic EL element by a temperature lower than the outside air temperature so as to have a temperature difference in a predetermined range from the outside air temperature, the chemical change speed of the organic fluorescent material can be slowed down even when the power amount to be injected into the organic fluorescent material is increased and the emission luminance is increased during use. Therefore, the speed of deterioration in photoelectric conversion efficiency is reduced, and the quality preservation period of the projection type image display apparatus can be lengthened. Furthermore, when cooling the EL element, condensation droplets are prevented from forming on the emission path from the EL element.

Furthermore when the EL element is cooled by using a forcibly cooling method, if condensation occurs on the light emission path from the element, it affects light projection. Therefore, condensation is prevented by providing at least two light transmitting windows in the light path of the emission side so as to closely seal the gaseous layer.

Furthermore, if cooling is carried out so that the temperature difference from the outside air temperature becomes 20° C. or higher, even when the light emission path is insulated from heat by two or more windows which seals gases, members holding the EL element themselves are gradually cooled, and cooling propagates and the window provided outermost is cooled and causes condensation. Therefore, in order to prevent this problem, the lowest cooling temperature of the EL element is controlled so that its difference from the outside air temperature falls within 20° C., preferably 15° C.

As a cooling method for the EL element, in place of the Peltier element, it is also allowed that cooling is carried out by thermal diffusion by using a metal or ceramic with high heat conductivity and ventilation or circulation of a liquid refrigerant.

Embodiment 5

As an optical modulation device, a light emitting element in which an inorganic fluorescent material is provided in its luminescent layer or an inorganic electroluminescence (EL) element which causes broadband wavelength spectrum emission by injecting electronic charges into silicon nanoparticles exists.

The abovementioned inorganic EL element has very little aging deterioration in photoelectric conversion efficiency in comparison with the organic material although its luminous efficiency changes depending on its own temperature environment. Furthermore, the element has a feature in that the element hardly deteriorates as long as it is used within a temperature environment which does not damage the thin film layered structure or within environmental limitations in electric field application.

Therefore, the inorganic EL element has very little deterioration due to turning-on for a long period although its photoelectric conversion efficiency does not approach that of the organic EL material, it is advantageous in operation with stable quality for a long period as a projector.

In embodiments given below, projection type image display apparatuses using the abovementioned inorganic EL element are described.

Figure 14:
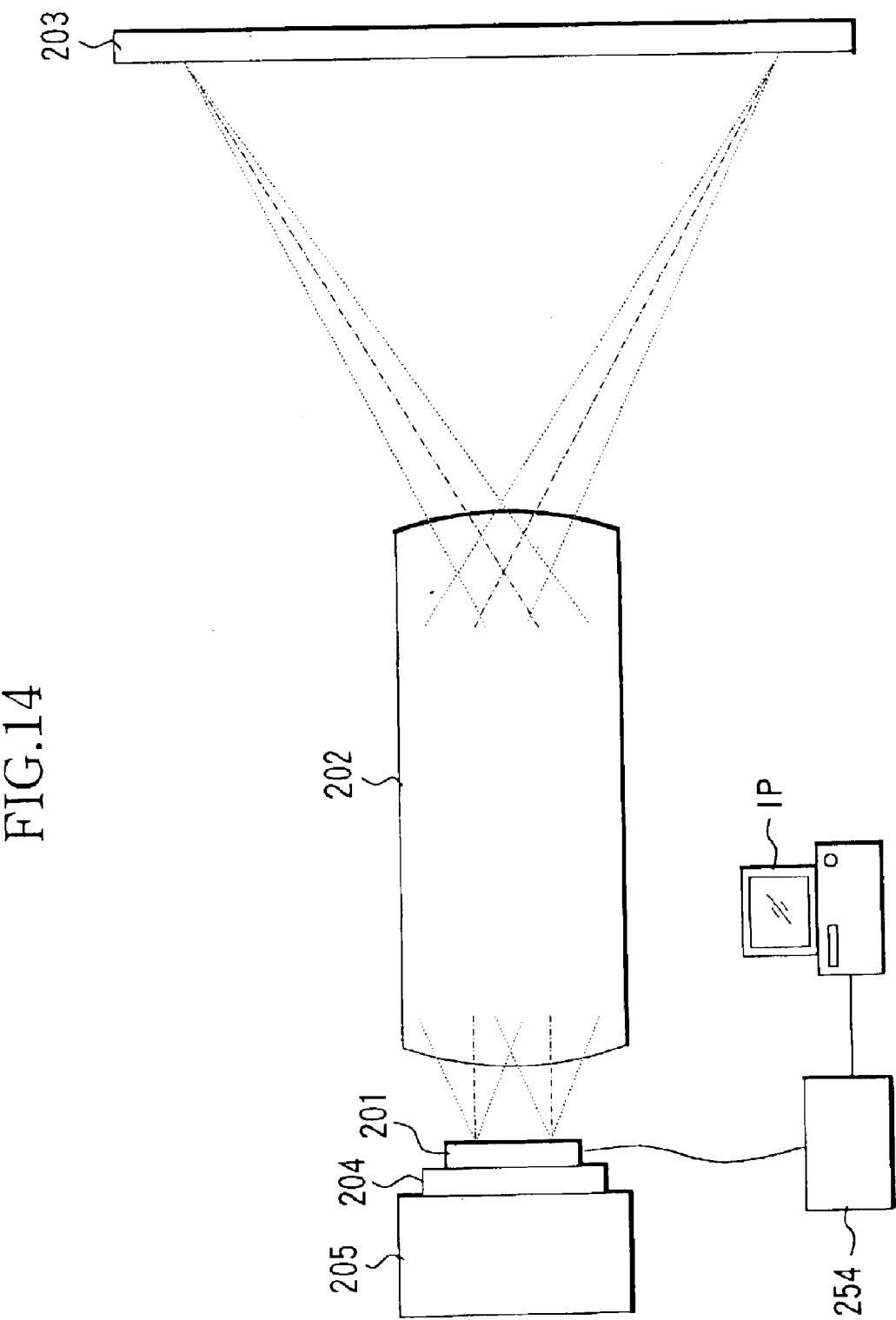
FIG. 14 is a schematic diagram of a projector of Embodiment 5 of the present invention.

FIG. 14 is a sectional view of a main optical system forming a projector (projection type image display apparatus) of Embodiment 5 of the present invention.

An EL element 201 projects image information as emission pattern information. This EL element 201 comprises a plurality of pixels which emit light so as to express image information as light emission pattern information.

The EL element 201 is electrically controlled based on electrical signals from a display controller 254. Image signals are inputted into the display controller 254 from an image signal providing apparatus IP such as a personal computer, a DVD player, a VCR, a video camera, a television, or a unit of an antenna to receive image signal and a tuner. The controller 254 supplies electrical signals for making the EL element 201 to emit light to display an image to the EL element 201 (the same applies to the next Embodiment 6 although it is not shown). Thereby, the EL element 201 emits image information light (modulated light). A detailed structure of the EL element 201 will be described later.

Light emitted from the EL element 201 is projected onto a screen 203 by a projection lens 202. Herein, a screen having light diffusibility may be used as the screen 203.

On the other hand, energy conversion loss during photoelectric conversion of the EL element 201 is mostly converted into heat energy, so that there is a possibility that the EL element 201 excessively raises its temperature. Therefore, on the back surface of the EL element 201, a Peltier element 204 is provided so that its low temperature gradient surface closely adheres to the back surface of the EL element 201. The Peltier element 204 generates a temperature gradient by means of the Seebeck effect and performs a cooling effect on one surface. Thereby, the EL element 1 is cooled.

Furthermore, the EL element 201 may be controlled in temperature by cooling while monitoring the temperature of the Peltier element 204 with a temperature sensor that is not shown.

Furthermore, at a high temperature gradient surface (opposite surface of the low temperature gradient surface) of the Peltier element 204, ventilation cooling is carried out by room temperature air by a ventilation fan 205. As a cooling method for the EL element 201, in place of the method using the Peltier element 204, it is also allowed that cooling is carried out by thermal diffusion by using a metal or ceramic with high heat conductivity and ventilation or circulation of a liquid refrigerant.

Figure 16:
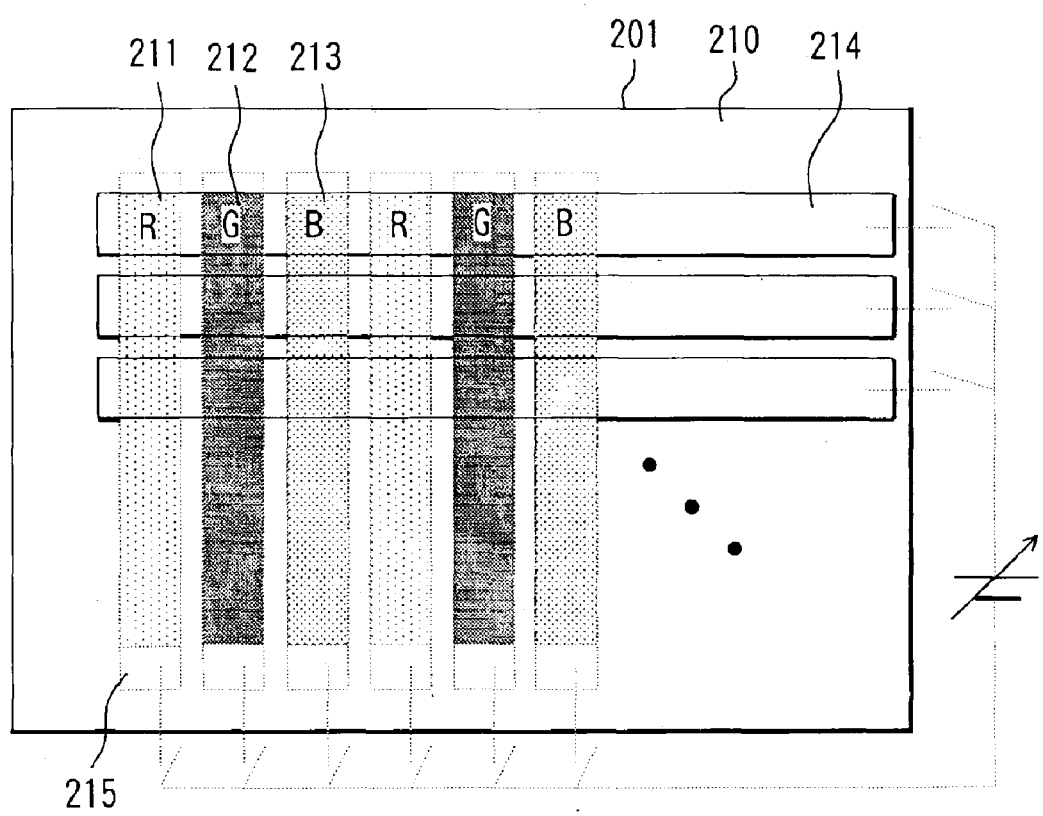
FIG. 16 is a schematic diagram of an EL element to be used in Embodiment 5.
Figure 16:
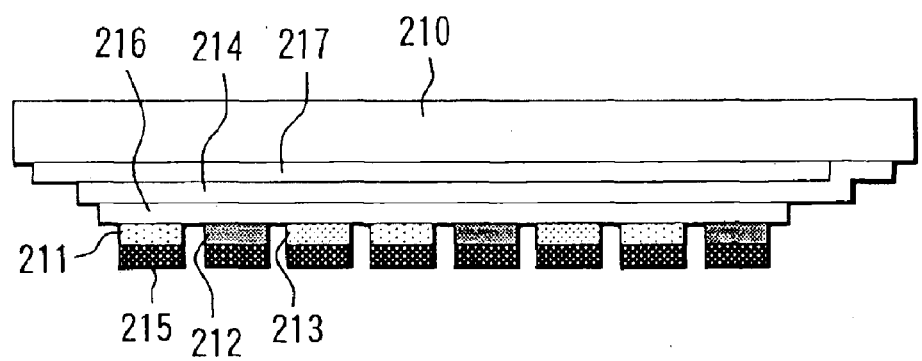

Next, the structure of the EL element 201 used in this embodiment is described with reference to FIGS. 16(A) and 16(B). In the basic structure of the EL element 201, as shown in FIG. 16(B), a transparent glass substrate 210 is used as a base material, and thin film EL material layers 211, 212, and 213 are sandwiched by ITO (Indium Tin Oxide) transparent thin film electrodes 214 and metal thin film electrodes 215. In order to efficiently inject only hole carriers into the EL materials, a hole transporting layer 216 is provided between the transparent thin film electrode 214 and thin film EL material layers 211, 212, and 213.

Furthermore, when it is used as a projecting light source (modulating light source), in order to improve the percentage of harvesting emitted light by the projection lens 203 and to improve photoelectric conversion efficiency (outward light luminous efficiency), a dielectric multilayer reflecting mirror layer 217 is provided at the outer side of the ITO transparent thin film electrode 214, and an optical resonance structure is formed by this dielectric multilayer reflecting mirror layer 217 and the light reflecting surface of the metal thin film electrode 215. Thereby, the light emission direction is provided with directivity perpendicular to the glass substrate 210 by means of resonance although the condition does not bring about an induced emission action.

This simultaneously achieves a band narrowing effect on the emission wavelength spectrum, and an emission light wavelength can be set by designing the resonance distance. The above is a description of the basic structure of the EL element.

Herein, each emission pixel is formed by a wiring matrix arrangement of the ITO transparent thin film electrode 214 and the metal thin film electrode 215, and the emission wavelength of 1 nanometer order is adjusted by the resonance mirror pitch. On the other hand, emission colors such as red, green, and blue are determined by EL materials. As shown in FIG. 16(A), the EL element 201 that expresses full-color images is achieved by arranging an EL material 211 handling red light, an EL material 212 handling green light, and an EL material 213 handling blue light by turns. Namely, in this embodiment, additive color images are displayed by using three EL materials 211, 212, and 213.

Herein, patterning of the EL materials 211, 212, and 213 are generally carried out by coating inorganic or organic fluorescent materials on the substrate by means of vapor deposition method. Namely, in order to prepare an EL element in which three primary color emission pixels are arranged, coating needless portions are masked for each color by resist patterning, and then three primary color EL materials are coated in order by the liftoff method.

In this embodiment, a device structure of a passive drive type is shown as an EL element, however, the invention can also be adapted to a current control active drive type device structure having thin film transistors installed inside.

Next, the EL materials are described. In this invention, organic fluorescent materials are not necessarily used for emission of all of the red, green and blue colors, and an inorganic material is used for emission of at least one color among the three colors.

In this embodiment, an organic fluorescent material containing tris-(8-hydroxiquinoline)aluminum in major proportions with high photoelectric conversion efficiency is used for the EL material handling green to carry out low-power emission, whereby the rate of deterioration in photoelectric conversion efficiency is slowed down.

Furthermore, a blue inorganic fluorescent material containing europium-doped barium aluminate (chemical formula: $BaAl_y S_{4-x} O_x:Eu(0.5 \leq x \leq 3.5)(1.5 \leq y \leq 2.5)$) is used for the EL material handling blue.

Thereby, more power can be applied than in the case of an organic EL material although heat generation occurs, and higher emission luminance can be obtained. Furthermore, different from an organic fluorescent material which has $\pi$ electrons by itself, emission is obtained by a hetero structure of energy band gap activation, so that the speed of deterioration in photoelectric conversion efficiency due to element heating can be reduced to be much slower than in the case using an organic EL material, and the EL element life can be lengthened.

Furthermore, when a silicon nanoparticle EL material is used for the EL material handling red, this EL material carries out carrier injecting emission due to its micro space quantum well structure as in the case of an inorganic fluorescent material, so that the speed of deterioration in photoelectric conversion efficiency due to element heating can be reduced to be much slower than in the case using an organic EL material, and the EL element life can be lengthened.

Furthermore, emission spectrum from silicon nanoparticles can be controlled by the particle size of the nanoparticles, annealing conditions, the mixture ratio of sputtering materials, and ion injection conditions. Therefore, the organic fluorescent EL material can emit pure red light that is close to a wavelength of 630 nm and does not approximate orange, and this also provides an effect of widening the color expression range.

However, in comparison with an organic EL material, an inorganic EL material is comparatively low in photoelectric conversion efficiency, so that there is a high possibility of occurrence of physical element breakage or heat energy generation due to electric field strength leakage. Therefore, it is necessary that a temperature that does not cause physical breakage along with expansion of the EL element itself and a wiring resistance increase is set as a limit operation temperature, and the EL element is cooled so as not to exceed the limit operation temperature.

Embodiment 6

Figure 15:
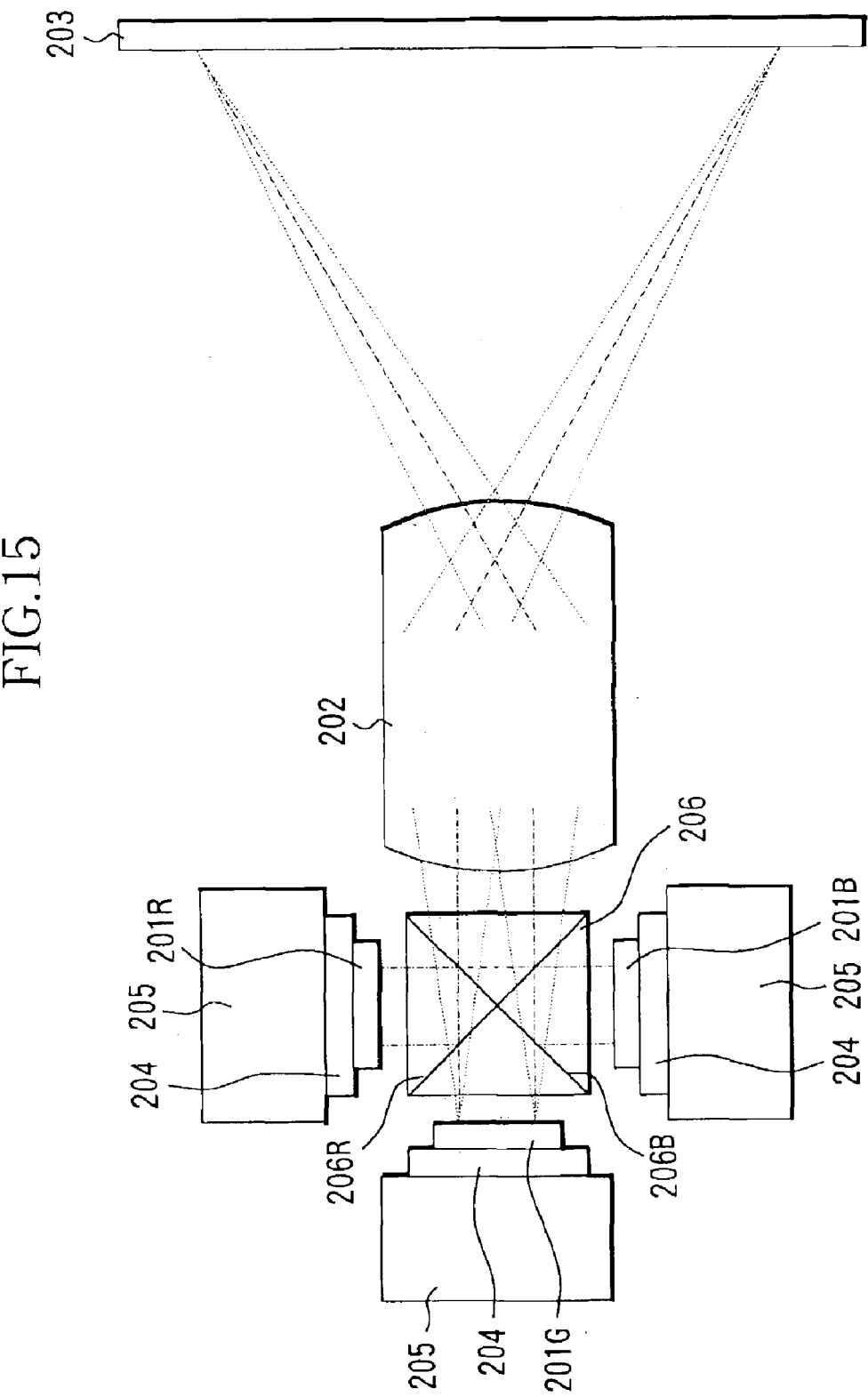
FIG. 15 is a schematic diagram of a projector of Embodiment 6 of the present invention.

FIG. 15 shows a sectional view of a main optical system forming a projector (projection type image display apparatus) of Embodiment 6 of the present invention.

EL elements 201R, 201G, and 201B emit light in colors of the additive three primary colors of red, green, and blue, respectively, and comprise a plurality of pixels which emit image information as light emission pattern information.

The EL elements are electrically controlled based on electrical signals from a display controller (denoted by 254 of Embodiment 5). The display controller supplies electrical signals to the respective EL elements so as to make them carry out emission and display image information based on image signals inputted from an image signal providing apparatus (denoted by IP of Embodiment 5). Thereby, the three EL elements 201R, 201G, and 201B emit image information light (modulated light) in colors that they respectively handle.

A detailed structure of the EL elements 201R, 201G, and 201B will be described later.

Light emitted from the EL elements 201R, 201G, and 201B is color-combining by a wavelength-combining prism (color-combining prism) 206. This wavelength-combining prism 206 (cross dichroic prism) is formed by arranging a dichroic waveband separating film 206R which reflects red color and transmits green and blue colors and a dichroic waveband separating film 206B which reflects blue color and transmits green and red colors in a crossing manner. Light in the green waveband is not reflected by the dichroic waveband separating films 206R and 206B and penetrates the wavelength-combining prism 20.

By using this wavelength-combining prism 206, light (image information light) emitted from the EL element 201R that handles red color is deflected toward a projection lens 202 by the dichroic waveband separating film 206R, and light (image information light) emitted from the EL element 201B that handles blue color is deflected toward the projection lens 202 by the dichroic waveband separating film 206B. Light (image information light) emitted from the EL element 201G that handles green color advances toward the projection lens 202 without receiving a deflecting effect.

A plurality of pixels provided for each of the EL elements 201R, 201G, and 201B are mechanically or electrically adjusted so that pixels associated with each other overlap each other on the screen 203 with a predetermined accuracy. Furthermore, in place of the wavelength-combining prism 206, a three-piece prism and a four-piece prism that is generally used for a received video light color separating optical system may be used as well as the illustrated cross dichroic prism.

Light wavelength-combined by the wavelength-combining prism 206 is projected onto the screen 203 by the projection lens 202. Herein, the screen 203 may have light diffusibility.

Furthermore, as in the description of Embodiment 5, each of the EL elements 201R, 201G, and 201B is cooled by a cooling unit using a Peltier element 204 and a ventilation fan 205 provided on its back surface to suppress excessive increases in temperature on the EL elements 201R, 201G, and 201B. In this case, temperature control may be carried out while monitoring the temperature of the Peltier element 204 by using a temperature sensor that is not shown.

In this embodiment, a cooling method using Peltier elements is employed to cool the EL elements, however, a method of cooling by thermal diffusion by using a metal or ceramic with high heat conductivity and ventilation or circulation of a liquid refrigerant may be employed.

Figure 17:
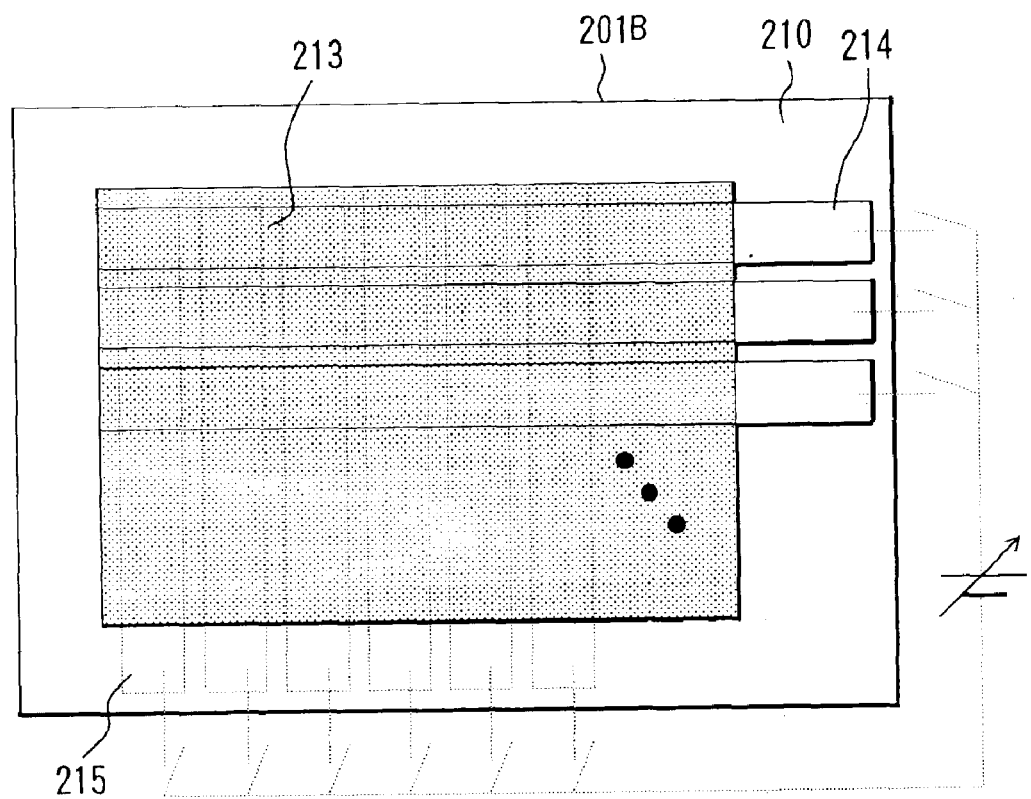
FIG. 17 is a schematic diagram of an EL element to be used in Embodiment 6.
Figure 17:
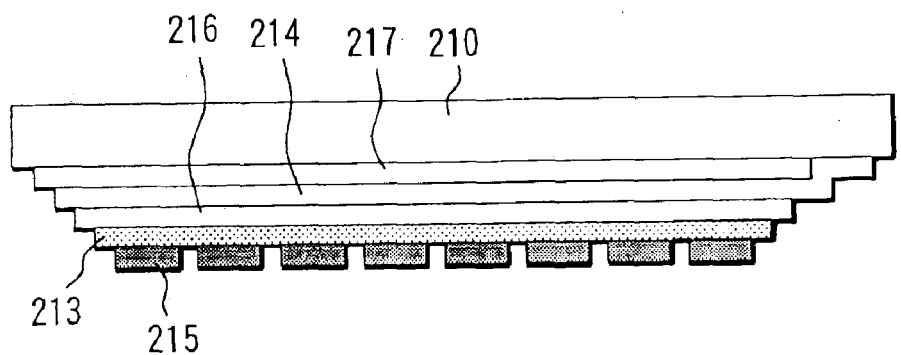

Next, EL elements used in this embodiment are described. The structure of the EL elements 201R, 201G, and 201B is as shown in FIGS. 17(A) and 17(B). In this figure, only the EL element 201B for blue color is shown, however, EL elements for other colors are structured in the same manner.

Although the EL element is structured by pattern-arranging three primary color EL materials in Embodiment 5, in this embodiment, a structure is employed in which only an EL material 211 for red color is used for the EL element 201R for red color, only an EL material 212 for green color is used for the EL element 201G for green color, and only an EL material 213 for blue color is used for the EL element 201B for blue color.

Furthermore, EL elements of the present invention are not limited to the structures of Embodiments 5 and 6. For example, although light emitted from the EL element using an inorganic EL material is in blue and light emitted from the EL element using an inorganic nanoparticle material is in red, these emission colors may be in any of blue, green and red or may be in other wavelength regions.

Furthermore, in Embodiments 5 and 6 mentioned above, an inorganic EL material is used for a part of the EL materials, however, inorganic EL materials may be used for all of the EL materials without using an organic EL material.

Furthermore, the projection type image display apparatuses of Embodiments 5 and 6 may be either a rear-projection type or a front-projection type. In the detailed structure, the screen 3 may be either a reflection type or a transmission type. By using a screen 203 with predetermined diffusibility, an image display system with which an observer recognizes images by directly viewing the screen 203 is structured. On the other hand, by using a screen with directivity obtained by using a hologram or a Fresnel structure, a system which carries out image display at a specific position can be structured.

The structure described in this embodiment can be applied not only to projectors but also to head-mount displays or head-up displays with which an observer observes virtual images formed by EL elements.

As described above, according to Embodiments 5 and 6, in order to solve the problem of deterioration in photoelectric conversion efficiency due to use of organic materials as EL materials to be used for a luminescent layer of EL elements, an inorganic EL material is used as an EL material handling at least one primary color among the three primary colors for expressing full color, so that projection illuminance of the projection type image display apparatus can be stably maintained for a long period. Furthermore, by using an EL element using inorganic EL materials for all three primary colors for expressing full color in a luminescent layer, images can be stably displayed for a period much longer than in the case of an apparatus using organic EL elements.

Furthermore, by employing inorganic EL materials for red and blue luminous bodies, images can be displayed in a wide color reproduction range.

While preferred embodiments have been described, it is to be understood that modification and variation of the present invention may be made without departing from the scope of the following claims.

What is claimed is:

1. A projection type image display apparatus, comprising:
    an electroluminescence element having a plurality of pixels that can be individually modulated, in which the modulating pixels which generate and emit light by means of recombination of excitons formed by injecting electron charge carriers into a luminescent layer are two-dimensionally arranged,
    a projection optical system which projects light emitted from the individual modulated pixels of the electroluminescence element,
    a controller which generates drive signals to control the emission amount of the electroluminescence element, wherein
    an electroluminescence material used for the luminescent layer is a phosphorescent material which emits phosphorescence by priority, which is emitted from an excited triplet state, and
    the controller superimposes intermittent turning-on signals with predetermined cycles on emission amount modulating signals which modulate current values to be injected into the pixels according to display image signals.

2. The projection type image display apparatus according to claim 1, wherein the electroluminescence element is structured by repeated matrix arrangement of pixels which emit light in three primary colors, and display additive color images.

3. The projection type image display apparatus according to claim 1, comprising:
    three electroluminescence elements each of which emits light in one color different from each other among three primary colors, and
    a wavelength-combining optical member having dichroic waveband separating films which combine light emitted from the three electroluminescence elements, wherein
    light combined by the wavelength-combining optical member is projected by the projecting optical system to display additive color images.

4. The projection type image display apparatus according to claim 1, wherein
    in the delaying emission characteristics of the electroluminescence element having the phosphorescent material in its luminescent layer, the time of half attenuation of emission intensity from a peak emission time is shorter than one millisecond.

5. The projection type image display apparatus according to claim 4, wherein
    the turning-off time of the intermittent turning-on signal in one cycle is shorter than the time to half-attenuation the emission intensity from a peak emission time in the delaying emission characteristics of the electroluminescence element using the phosphorescent material for its luminescent layer.

6. The projection type image display apparatus according to claim 1, wherein the intermittent turning-on signal has a turning-on time and a turning-off time equal to each other in one cycle, and the controller inverts the timing phase of turning-on and turning-off of the pixels handling emission in two out of three primary colors, corresponding to the inversion of the it phase, respectively, in the electroluminescence element.

7. The projection type image display apparatus according to claim 1, wherein the turning-on time and the turning-off time of the intermittent turning-on signal have a time ratio of 1 to 2, and the controller delays the timing phases of turning-on and turning-off of pixels handling emission in three primary colors, respectively, in the electroluminescence element by $2/3\pi$ to each other.

8. The projection type image display apparatus according to claim 1, wherein the turning-on time and the turning-off time in the intermittent turning-on signal has a time ratio of 2 to 1, and timing phases of turning-on and turning-off of the pixels handling emission in three primary colors, respectively, are delayed by $2/3\pi$ to each other.

9. An image display system, comprising:

a projection type image display apparatus according to claim 1, and a screen onto which images are projected by the projection type image display apparatus, and which reflects light from the projection type image display apparatus.

10. An image display system, comprising:

a projection type image display apparatus according to claim 1, and a screen onto which images are projected by the projection type image display apparatus, and which transmits light from the projection type image display apparatus.

11. A projection type image display apparatus, comprising:

an electroluminescence element having pixels that can be individually modulated, where a luminescent layer of the electroluminescence element is formed of a material containing an organic fluorescent material or an organic phosphorescent material, a projection optical system which projects modulated light emitted from the respective pixels of the electroluminescence element, an element temperature detector which detects the temperature of the electroluminescence element, an outside air temperature detector which detects the outside air temperature, a cooling unit provided on a surface other than a light emitting surface of the electroluminescence element, and a controller which controls the cooling unit so that a temperature detected by the element temperature detector becomes equal to or lower than a temperature detected by the outside air temperature detector and the difference from the temperature detected by the outside air temperature falls within a predetermined range.

12. The projection type image display apparatus according to claim 11, wherein the controller controls the cooling unit from the time of power supply to this projection type image display apparatus so that a difference between a temperature detected by the element temperature detector and a temperature detected by the outside air temperature detector falls within the predetermined range at a predetermined temporal gradient.

13. The projection type image display apparatus according to claim 11, wherein the cooling unit comprises a Peltier element.

14. The projection type image display apparatus according to claim 11, wherein at the light emitting surface side of the electroluminescence element, at least two light transmitting windows are provided so that an gas layer is sealed between these.

15. An image display system, comprising:

a projection type image display apparatus according to claim 11, and a screen onto which images are projected by the projection type image display apparatus, and which reflects light from the projection type image display apparatus.

16. An image display system, comprising:

a projection type image display apparatus according to claim 11, and a screen onto which images are projected by the projection type image display apparatus, and which transmits light from the projection type image display apparatus.

* * * * *